(12) United States Patent
Naito et al.

(10) Patent No.: US 9,256,062 B2
(45) Date of Patent: Feb. 9, 2016

(54) ELECTROWETTING DISPLAY APPARATUS AND DYE COMPOSITION FOR ELECTROWETTING DISPLAY

(71) Applicant: FUJIFILM CORPORATION, Minato-ku, Tokyo (JP)

(72) Inventors: Hiroyuki Naito, Fujinomiya (JP); Yasuhiro Ishiwata, Fujinomiya (JP); Takashi Kato, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 161 days.

(21) Appl. No.: 13/922,261

(22) Filed: Jun. 20, 2013

(65) Prior Publication Data
US 2014/0002888 A1      Jan. 2, 2014

(30) Foreign Application Priority Data

Jun. 28, 2012   (JP) ................................. 2012-146041

(51) Int. Cl.
*G02B 26/00*      (2006.01)
*C09B 55/00*      (2006.01)

(52) U.S. Cl.
CPC ............ *G02B 26/005* (2013.01); *C09B 55/009* (2013.01); *G02B 26/004* (2013.01)

(58) Field of Classification Search
CPC ........................... G02B 26/004; G02B 26/005
USPC .......................................... 359/290–292, 228
See application file for complete search history.

(56) References Cited

U.S. PATENT DOCUMENTS

| | | | |
|---|---|---|---|
| 4,847,378 A | * | 7/1989 | Zink .............................. 544/252 |
| 7,800,816 B2 | * | 9/2010 | Hayes et al. .................. 359/320 |

(Continued)

FOREIGN PATENT DOCUMENTS

| | | |
|---|---|---|
| EP | 1447430 A1 * | 8/2004 |
| JP | 2007-531917 | 11/2007 |
| JP | 2009-86668 A | 4/2009 |

(Continued)

OTHER PUBLICATIONS

Partial English language translation of the following: Office action dated May 7, 2014 from the Japanese Patent Office in a Japanese patent application corresponding to the isntant patent application. This office action translation is submitted now in order to supplement the understanding of patent document WO2012/033177 and JP2007-531917 which are cited in the office action and are being disclosed in the instant Information Disclosure Statement.

*Primary Examiner* — Thomas K Pham
*Assistant Examiner* — Mitchell Oestreich
(74) *Attorney, Agent, or Firm* — SOLARIS Intellectual Property Group, PLLC

(57) ABSTRACT

The electrowetting display apparatus includes a display unit including: a first substrate at least one surface of which is electroconductive; a second substrate disposed to face the electroconductive surface of the first substrate; a hydrophobic insulation film disposed on the electroconductive surface side of the first substrate; a non-electroconductive oil which is provided between the hydrophobic insulation film and second substrate movably on the hydrophobic insulation film and includes a non-polar solvent and an azamethine-based colorant containing two colorant mother nuclei bonded via a linking group represented by =N—; and an electroconductive hydrophilic liquid provided between the hydrophobic insulation film and second substrate to contact the oil; in which an image is displayed by applying a voltage between the hydrophilic liquid and the electroconductive surface of first substrate and changing the shape of interface between the oil and hydrophilic liquid.

9 Claims, 2 Drawing Sheets

(56) References Cited

U.S. PATENT DOCUMENTS

2008/0225374 A1    9/2008   Hayes et al.
2010/0296150 A1   11/2010   Hayes et al.
2013/0188238 A1    7/2013   Shiga et al.

FOREIGN PATENT DOCUMENTS

| | | |
|---|---|---|
| JP | 2011-095732 A | 5/2011 |
| WO | 2008/142086 A1 | 11/2008 |
| WO | 2012/033177 | 3/2012 |

* cited by examiner

ELECTROWETTING DISPLAY APPARATUS AND DYE COMPOSITION FOR ELECTROWETTING DISPLAY

CROSS-REFERENCE TO RELATED APPLICATION

This application claims priority under 35 USC 119 from Japanese Patent Application No. 2012-146041 filed on Jun. 28, 2012, the disclosure of which is incorporated by reference herein.

BACKGROUND OF THE INVENTION

1. Field of the Invention

The present invention relates to an electrowetting display apparatus and a dye composition for electrowetting display.

2. Description of the Related Art

Conventionally, there have been studies on optical elements that have a cell containing two or more liquids which are immiscible with each other (for example, two liquids of an oil and a hydrophilic liquid), and operate by applying a voltage. As such optical elements, an optical shutter, a variable focus lens, an image display apparatus, and the like are known, and in recent years, in particular, techniques using an electrowetting phenomenon have attracted attention.

As an example of a technique using an electrowetting phenomenon, an electrowetting display, including a first substrate and a second substrate that are disposed to face each other, plural protrusions defining plural pixel units, a non-electroconductive first fluid sealed in a pixel unit between two adjacent protrusions and a second fluid that is an electroconductive or polar liquid immiscible with the first fluid, has been disclosed (see, for example, Japanese Patent Application Laid-Open (JP-A) No. 2009-86668).

As a colorant, a number of colorants are known, and for example, a methine-based colorant having a methine group has been widely used conventionally (see, for example, International Publication No. 2008/142086). Further, as an example of the methine-based colorant, a dipyrromethene colorant and the like are known (see, for example, JP-A No. 2011-095732), and these colorants include a complex compound coordinated to a metal atom or a metal compound.

SUMMARY OF THE INVENTION

As described above, electrowetting display is one display technology that has recently attracted attention as an image display medium. Moreover, as a display medium that can replace a paper medium or the like, electrowetting display is required to have such properties as display speed when displaying an image, and favorable density, discernibility and high-definition of a displayed image.

Among various properties, there are stringent requirements for display speed (namely, image formation properties) and discernibility and high-definition of a displayed image.

In order to develop sufficient density of an image displayed by an electrowetting display, the concentration of an oil responsible for forming an image, namely the concentration of a coloring material contained in the oil, needs to be increased. In general, dyes are used as a coloring material in an oil. However, dyes sometimes have poor solubility in a non-polar solvent constituting an oil phase, and therefore it is difficult to increase the concentration of the coloring material to a level suitable for an image display, while maintaining good display properties.

Meanwhile, in a case in which a dye having high solubility in a non-polar solvent is used, the color density of the oil itself is increased. However, if the dye amount is too large, the operating sensitivity (responsiveness) of the oil in response to an applied voltage is decreased, and the image formation properties tend to deteriorate significantly.

Consequently, in order to keep the image display properties of a display at reasonable levels, image quality has had to be sacrificed. In other words, a technique enabling both favorable image display properties (namely, image formation properties such as display speed) and favorable image quality has not yet been established.

The present invention has been made in consideration of the above. The present invention aims to provide an electrowetting display apparatus and a dye composition for electrowetting display, which enable excellent responsiveness during image display and prevent image distortion due to a back-flow phenomenon.

The present invention has made the following discoveries and is accomplished based on these discoveries.

Specifically, a coloring material contained in an oil phase contributing to imaging is advantageous in increasing display properties such as responsiveness, because the coloring material has high solubility in a non-polar solvent used for forming the oil phase. In particular, when a specific colorant is used as the coloring material, the solubility is improved and, further, when it is contained in an oil phase with an increase in the colorant concentration, an effect of improving the responsiveness is observed, and when a voltage application state is maintained, the back-flow phenomenon is also alleviated.

Back-flow is a phenomenon in which a region of an oil that shrinks and is reduced while the voltage application state is maintained, spreads over time.

Examples of specific embodiments of the present invention are as follows.

<1> An electrowetting display apparatus including a display unit, the display unit including:

a first substrate at least one surface of which is at least partly electroconductive; a second substrate disposed so as to face the at least partly electroconductive surface of the first substrate;

a hydrophobic insulation film disposed on at least a part of the at least partly electroconductive surface of the first substrate;

a non-electroconductive oil that is provided between the hydrophobic insulation film and the second substrate movably on the hydrophobic insulation film and that includes a non-polar solvent and an azamethine-based colorant including two colorant mother nuclei bonded via a linking group represented by $=\!\!N\!\!-\!\!$; and an electroconductive hydrophilic liquid provided between the hydrophobic insulation film and the second substrate so as to contact the oil, wherein an image is displayed by applying a voltage between the hydrophilic liquid and the at least partly electroconductive surface of the first substrate and changing the shape of an interface between the oil and the hydrophilic liquid.

<2> The electrowetting display apparatus according to <1>, wherein the azamethine-based colorant contains neither a metal atom nor a metal compound, forming a complex.

<3> The electrowetting display apparatus according to <1> or <2>, wherein the azamethine-based colorant has a solubility in n-hexane at 25° C. and 0.1 MPa of 1% by mass or more.

<4> The electrowetting display apparatus according to any one of <1> to <3>, wherein the azamethine-based colorant is a colorant represented by the following Formula (1):

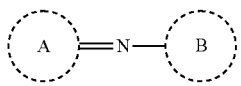

Formula (1)

wherein, in Formula (1), A and B each independently represent a colorant mother nucleus having no dissociable group.

<5> The electrowetting display apparatus according to any one of <1> to <4>, wherein the azamethine-based colorant is a colorant represented by the following Formula (2):

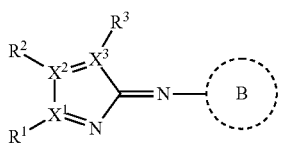

Formula (2)

wherein, in Formula (2), $R^1$, $R^2$, and $R^3$ each independently represent a hydrogen atom or a monovalent substituent; $X^1$, $X^2$, and $X^3$ each independently represent a carbon atom or a nitrogen atom; provided that when $X^1$, $X^2$, or $X^3$ represents a nitrogen atom, none of $R^1$, $R^2$, or $R^3$ is linked to $X^1$, $X^2$, or $X^3$ representing a nitrogen atom; and B represents a colorant mother nucleus having no dissociable group.

<6> The electrowetting display apparatus according to any one of <1> to <5>, wherein the two colorant mother nuclei have the same skeleton.

<7> The electrowetting display apparatus according to any one of <1> to <6>, wherein each of the two colorant mother nuclei contains a pyrrole ring.

<8> The electrowetting display apparatus according to any one of <1> to <7>, wherein the azamethine-based colorant includes a linear or branched alkyl group having 4 to 30 carbon atoms.

<9> The electrowetting display apparatus according to any one of <1> to <8>, wherein the azamethine-based colorant has a molecular weight of from 200 to less than 3,000.

<10> The electrowetting display apparatus according to any one of <1> to <9>, wherein a total amount of coloring material contained in the oil is 20% by mass or more with respect to a total amount of the oil, and a content of the azamethine-based colorant in the oil is 5% by mass or more with respect to the total amount of the oil.

<11> An electrowetting display apparatus including a display unit, the display unit including:
a first substrate at least one surface of which is at least partly electroconductive;
a second substrate disposed so as to face the at least partly electroconductive surface of the first substrate;
a hydrophobic insulation film disposed on at least a part of the at least partly electroconductive surface of the first substrate;
a non-electroconductive oil that is provided between the hydrophobic insulation film and the second substrate movably on the hydrophobic insulation film and that includes a non-polar solvent and a colorant having a molar extinction coefficient of 20,000 or more in a maximum absorption wavelength and a relative dielectric constant of 5.1 or less; and
an electroconductive hydrophilic liquid provided between the hydrophobic insulation film and the second substrate so as to contact the oil;
wherein an image is displayed by applying a voltage between the hydrophilic liquid and the at least partly electroconductive surface of the first substrate and changing the shape of an interface between the oil and the hydrophilic liquid.

<12> A dye composition for electrowetting display, including:
a non-polar solvent; and
an azamethine-based colorant including two colorant mother nuclei bonded via a linking group represented by =N—.

<13> The dye composition for electrowetting display according to <12>, wherein the azamethine-based colorant includes a linear or branched alkyl group having 4 to 30 carbon atoms.

<14> The dye composition for electrowetting display according to <12> or <13>, wherein a total amount of coloring material contained in the oil is 20% by mass or more with respect to a total amount of the oil, and a content of the azamethine-based colorant in the oil is 5% by mass or more with respect to the total amount of the oil.

<15> A dye composition for electrowetting display, including:
a non-polar solvent; and
a colorant having a molar extinction coefficient of 20,000 or more in a maximum absorption wavelength and a relative dielectric constant of 5.1 or less.

According to the present invention, there are provided an electrowetting display apparatus and a dye composition for electrowetting display, which enable excellent responsiveness during the image display with prevented image distortion caused by a back-flow phenomenon.

DETAILED DESCRIPTION OF THE INVENTION

Hereinbelow, exemplary embodiments of the electrowetting display apparatus will be described in detail with reference to the drawings, and through the description, the dye composition for electrowetting display is also intended to be described in detail. However, the present invention is not limited to the following exemplary embodiments.

A first exemplary embodiment of the electrowetting display apparatus of the present invention will be described with reference to FIGS. 1 and 2. The present exemplary embodiment has a configuration in which an ITO-coated glass substrate is used as a first substrate having conductivity, decane is used as a non-polar solvent that is a constituent of the oil, and an aqueous electrolyte solution is used as a hydrophilic liquid.

Figure 1:
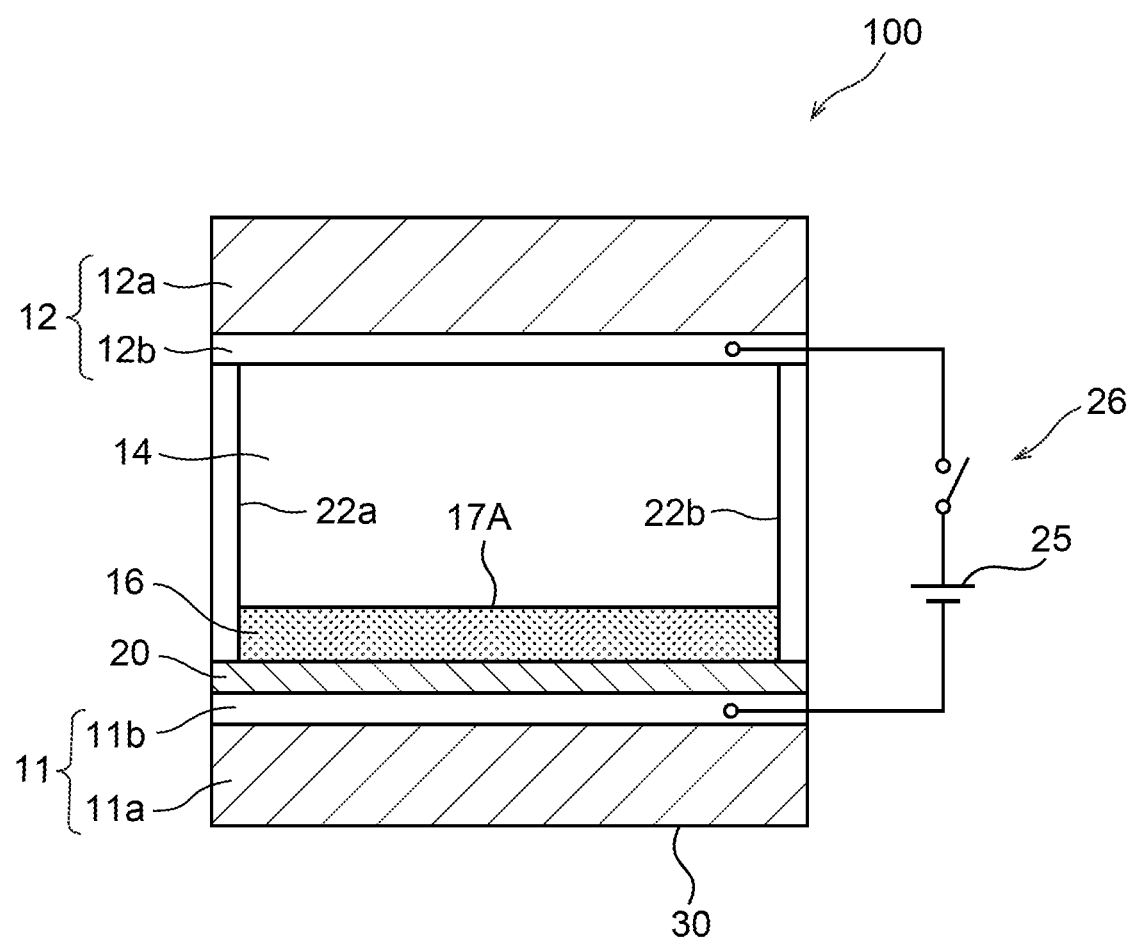
FIG. 1 is a schematic cross-sectional view showing an electrowetting display apparatus according to an exemplary embodiment of the present invention in the voltage-off state.

As shown in FIG. 1, an electrowetting display apparatus 100 of the present exemplary embodiment includes: a substrate (first substrate) 11 having electroconductivity; a substrate (second substrate) 12 having electroconductivity disposed so as to face the substrate 11; a hydrophobic insulation film 20 disposed on the substrate 11; and a hydrophilic liquid 14 and an oil 16 which are filled in a region partitioned by a silicone rubber wall 22a and a silicone rubber wall 22b between the hydrophobic insulation film 20 and the substrate 12. The region partitioned by the silicone rubber wall 22a and the silicone rubber wall 22b between the hydrophobic insulation film 20 and the substrate 12 serves as a display unit (display cell) which is capable of displaying an image in accordance with the transfer of the oil 16.

According to various previous studies concerning a technology of electrowetting, there is a tendency that when a non-polar solvent, which is a constituent of an oil phase, contains a solvent-soluble colorant such as a dye, the responsiveness during the image display is deteriorated, and the back-flow while maintaining the voltage application state is also deteriorated. This tendency is more remarkably shown when the color density is intended to be increased for improving the quality of a displayed image. In the present invention, by using a colorant as described below, in particular, as a colorant component used for coloration of an oil phase in electrowetting technology, the responsiveness during the image display is specifically improved and the back-flow in the voltage application state is specifically alleviated while ensuring dye solubility.

The substrate 11 has a substrate material 11a and an electroconductive film 11b (for example, an ITO film) which has electroconductivity and is disposed on the substrate material 11a, and is configured so that the entire surface of the substrate exhibits electroconductivity. The substrate 12 is disposed at a position facing the substrate 11. The substrate 12 has a substrate material 12a and an electroconductive film 12b (for example, an ITO film) which has electroconductivity and is disposed on the substrate material 12a, as in the substrate 11, and is configured so that the entire surface of the substrate exhibits electroconductivity. In the present exemplary embodiment, the substrate 11 and the substrate 12 are formed from a transparent glass substrate and a transparent ITO film provided thereon.

The substrate material 11a and the substrate material 12a may be formed using either a transparent material or a non-transparent material, depending on the display mode of the apparatus. From a viewpoint of displaying an image, it is preferable that at least one of the substrate material 11a or the substrate material 12a has optical transparency. Specifically, at least one of the substrate material 11a or the substrate material 12a has preferably a transmittance of 80% or higher, and more preferably 90% or higher, in the entire wavelength range from 380 nm to 770 nm.

Examples of the materials used for the substrate material 11a and substrate material 12a include a glass substrate such as an alkali-free glass substrate, a soda glass substrate, a PYREX (registered trademark) glass substrate, or a quartz glass substrate; a plastic substrate such as a polyethylene naphthalate (PEN) substrate, a polyethylene terephthalate (PET) substrate, a polycarbonate (PC) substrate, or a polyimide (PI) substrate; a metal substrate such as an aluminum substrate or a stainless steel substrate; and a semiconductor substrate such as a silicon substrate. Among these, from a viewpoint of optical transparency, a glass substrate or a plastic substrate is preferable.

Further, as a substrate material, a TFT substrate provided with a thin-film transistor (TFT) may be used. In this case, a mode in which an electroconductive film is connected to the TFT, namely, a mode in which the electroconductive film is a pixel electrode connected with the TFT, is favorable. By this means, a voltage can be applied independently to each pixel, and active drive of the entire image display apparatus can be made similarly as in a known liquid crystal display apparatus provided with a TFT.

The arrangement of a TFT, various wirings, storage capacitors, and the like in the TFT substrate may be as a known arrangement, and, for example, the arrangement described in Japanese Patent Application Laid-Open (JP-A) No. 2009-86668 may be referred to.

The electroconductive film 11b and the electroconductive film 12b may be either a transparent film or a non-transparent film, depending on the display mode of the apparatus. An electroconductive film means a film having electroconductivity, and the electroconductivity means such an electric conducting property as enables application of a voltage, and specifically to have a surface resistance of 500 Ω/sq or less, preferably 70 Ω/sq or less, more preferably 60 Ω/sq or less, and further preferably 50 Ω/sq or less.

The electroconductive film may be either of a non-transparent metal film such as a copper film or a transparent film, but a transparent electroconductive film is preferable from a viewpoint of imparting optical transparency for image display. A transparent electroconductive film preferably has a transmittance of 80% or higher, and more preferably 90% or higher, over the entire wavelength range from 380 nm to 770 nm. Examples of a transparent electroconductive film include films containing at least one of indium tin oxide (ITO), indium zinc oxide (IZO), tin oxide, indium oxide, zirconium oxide, zinc oxide, cadmium oxide, or magnesium oxide. Among these, a film containing indium tin oxide (ITO) is preferable as a transparent electroconductive film, in terms of optical transparency and electro conductivity.

The amount of tin oxide in an ITO-containing film is preferably in a range from 5 mass % to 15 mass %, and more preferably in a range from 8 mass % to 12 mass %, from a viewpoint of lowering the resistance value.

The specific resistivity of the electroconductive film is not particularly limited, but may be, for example, $1.0 \times 10^{-3}$ Ω·cm or less.

In a preferable embodiment, an electrical potential common to plural display cells constituting display pixels is applied to the electroconductive film 12b of the substrate 12, while an independent electrical potential with respect to each display pixel (display cell) is applied to an electroconductive film 11b of the substrate 11, such that an independent voltage is applied to each display cell (pixel). With respect to such an embodiment, known modes for a liquid crystal display apparatus may be referred to.

In the present embodiment, the substrate 12 is provided as an electroconductive substrate similarly to the substrate 11. However, an embodiment in which the substrate 12 has no electroconductive film and is not electroconductive, and a voltage is applied between the electroconductive film 11b and the hydrophilic liquid 14, may also employed. In this case, there is no particular restriction on the configuration of the substrate 12, and the materials which may be used for the substrate material 12a as mentioned above may be used.

The hydrophobic insulation film 20 is provided over the entire surface of the electroconductive film 11b of the substrate 11 and contacts at least the oil 16. The hydrophobic insulation film is in a state in which it contacts mainly the oil, when a voltage is not applied (i.e., image non-display stage). When a voltage is applied (i.e., image display stage), the oil moves on the surface of the insulation film, and a region on the hydrophobic insulation film 20 where the oil becomes absent comes into a state of contacting the hydrophilic liquid.

The hydrophobicity means a property with which the contact angle with respect to water exhibits 60° or higher, preferably 70° or higher, and more preferably 80° or higher, when water is contacted.

The contact angle may be measured by a general method of measuring wettability of a glass substrate, such as a method described in JIS R3257 "Testing Method of Wettability of Glass Substrate; 6. Sessile Drop Method". Specifically, the contact angle may be measured in such a manner that: using a contact angle meter (for example, CONTACT ANGLE METER CA-A (trade name), manufactured by Kyowa Interface Science Co., Ltd.), a waterdrop in a size of 20 scale units is formed, and extruded through a needle to contact a hydrophobic insulation film to form a waterdrop thereon, and after being left standing for 10 sec, the profile of the waterdrop is observed through an inspection hole of the contact angle meter to obtain the contact angle θ (25° C.).

The "insulation" of an insulation film means a property, with which the specific resistance is $10^7$ Ω·cm or higher, and the specific resistance is preferably $10^8$ Ω·cm or higher, more preferably $10^9$ Ω·cm or higher.

As a hydrophobic insulation film, an insulation film having affinity with the oil 16 and has a low affinity with the hydrophilic liquid 14 may be used, and from a viewpoint of suppression of film deterioration caused by movements of the oil by repeated application of a voltage, a film having a cross-linked structure derived from a polyfunctional compound is preferable. In particular, the hydrophobic insulation film is preferably a film having a cross-linked structure derived from a polyfunctional compound having 2 or more polymerizable groups. The cross-linked structure may be favorably formed by polymerizing at least one polyfunctional compound, and, if necessary, another monomer.

In the present embodiment, the film is formed from a copolymer obtained by copolymerization of a 5-membered cyclic perfluorodiene.

The polyfunctional compound is a compound having 2 or more polymerizable groups in a molecule. Examples of polymerizable groups include a radical-polymerizable group, a cation-polymerizable group, and a condensation-polymerizable group. Among them, a (meth)acryloyl group, an allyl group, an alkoxysilyl group, an α-fluoroacryloyl group, an epoxy group, a —C(O)OCH=$CH_2$ group, and the like are preferable. Further, the two or more polymerizable groups contained in the polyfunctional compound may be the same or different from each other.

For forming a cross-linked structure, polyfunctional compounds may be used singly or in combination of two or more thereof.

As the polyfunctional compound, known polyfunctional polymerizable compounds, such as a radical-polymerizable group, a cation-polymerizable group, or a condensation-polymerizable group, may be used. Examples of polyfunctional compounds include polyfunctional acrylates such as ethylene glycol di(meth)acrylate, diethylene glycol di(meth)acrylate, polyethylene glycol di(meth)acrylate, 1,6-hexanediol di(meth)acrylate, ethoxylated 1,6-hexanediol diacrylate, neopentylglycol di(meth)acrylate, ethoxylated neopentylglycol di(meth)acrylate, propoxylated neopentylglycol di(meth)acrylate, tripropylene glycol di(meth)acrylate, polypropylene glycol diacrylate, 1,4-butanediol di(meth)acrylate, 1,9-nonanediol diacrylate, tetraethylene glycol diacrylate, 2-n-butyl-2-ethyl-1,3-propanediol diacrylate, dimethyloltricyclodecane diacrylate, hydroxypivalate neopentylglycol diacrylate, 1,3-butyleneglycol di(meth)acrylate, ethoxylated bisphenol A di(meth)acrylate, propoxylated bisphenol A di(meth)acrylate, cyclohexane dimethanol di(meth)acrylate, dimethyloldicyclopentane diacrylate, trimethylolpropane triacrylate, ethoxylated trimethylolpropane triacrylate, propoxylated trimethylolpropane triacrylate, pentaerythritol triacrylate, tetramethylolpropane triacrylate, tetramethylolmethane triacrylate, pentaerythritol tetraacrylate, caprolactone-modified trimethylolpropane triacrylate, ethoxylated isocyanuric acid triacrylate, tri(2-hydroxyethyl isocyanurate) triacrylate, propoxylated glyceryl triacrylate, tetramethylolmethane tetraacrylate, pentaerythritol tetraacrylate, ditrimethylolpropane tetraacrylate, ethoxylated pentaerythritol tetraacrylate, dipentaerythritol hexaacrylate, neopentylglycol oligoacrylate, 1,4-butanediol oligoacrylate, 1,6-hexanediol oligoacrylate, trimethylolpropane oligoacrylate, pentaerythritol oligoacrylate, urethane acrylate, epoxy acrylate, or polyester acrylate.

As the polyfunctional compound, polyfunctional polymerizable compounds other than those mentioned above may be used, and examples of other polymerizable compounds known polyfunctional polymerizable compounds described in Paragraphs 0031 to 0035 of JP-A No. 2008-181067, Paragraphs 0149 to 0155 of JP-A No. 2008-139378, Paragraphs 0142 to 0146 of JP-A No. 2010-134137, or the like.

The polyfunctional compound has preferably 3 or more, more preferably 4 or more, and further preferably 5 or more polymerizable groups in a molecule. By this configuration, the density of the cross-linked structure in a film is further increased, and therefore the deterioration of a hydrophobic insulation film which may be caused by repeated application of a voltage is further suppressed.

As a polyfunctional compound, a fluorine-containing compound is preferable, and a polyfunctional compound having a fluorine content of 35 mass % or higher, preferably 40 mass % or higher, and more preferably 45 mass % or higher, with respect to the molecular weight is preferable. When the polyfunctional compound contains a fluorine atom (especially, when the fluorine content with respect to the molecular weight is 35 mass % or higher), the hydrophobicity of the hydrophobic insulation film is improved. Although there is no particular restriction on the upper limit of the fluorine content in a polyfunctional compound, the upper limit of the fluorine content with respect to the molecular weight may be, for example, 60 mass %, preferably 55 mass %, and more preferably 50 mass-%.

Examples of a fluorine-containing compound as a polyfunctional compound include the fluorine-containing compounds described in Paragraphs 0007 to 0032 of JP-A No. 2006-28280.

The polymerization method for the polyfunctional compound is preferably bulk polymerization or solution polymerization.

Examples of a polymerization initiation method include a method using a polymerization initiator (for example, a radical initiator), a method of irradiation with light or radiation, a method of addition of an acid, a method of addition of a photoacid generator followed by irradiation with light, and a method of heating for dehydration condensation. Such polymerization methods and polymerization initiation methods are described, for example, in "Kobunshi Gosei Houhou (Macromolecule Synthesis Method)" (revised version), written by Tsuruta Teiji, Nikkan Kogyo Shinbun, Ltd., 1971, and "Kobunshi Gosei no Jikken-hou (Experimental Method for Macromolecule Synthesis)", co-written by Otsu Takayuki and Kinoshita Masayoshi, Kagaku-Dojin Publishing Company, Inc., 1972, p. 124 to 154.

The hydrophobic insulation film may be favorably formed using a curable composition containing the polyfunctional compound. The curable composition may contain one kind, or two or more kinds of the polyfunctional compounds, and the curable composition may further contain a monofunctional compound. As the monofunctional compound, any one of known monofunctional monomers may be used.

There is no particular restriction on the content (or the total content when two or more polyfunctional compounds are used; the same applies to the description hereinbelow) of the polyfunctional compound in the curable composition. However, from a viewpoint of the curing property, the content (or the total content) is preferably 30 mass % or higher, more preferably 40 mass % or higher, and particularly preferably 50 mass % or higher, with respect to the total solid in the curable composition. The total solid means the total components other than a solvent.

It is preferable that the curable composition further contain at least one solvent. Examples of the solvent include ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, 1-butanol, propylene glycol monomethyl ether, propylene glycol monomethyl ether acetate, cyclohexanone, cyclohexanol, ethyl lactate, methyl lactate, and caprolactam.

The content of a solvent (or the total content when two or more solvents are used) in the curable composition is preferably from 20 to 90 mass %, more preferably from 30 to 80 mass %, and particularly preferably from 40 to 80 mass %, with respect to the total mass of the curable composition.

It is preferable that the curable composition further contain at least one polymerization initiator. As the polymerization initiator, a polymerization initiator which generates a radical owing to the action of at least one of heat or light is preferable.

Examples of a polymerization initiator which initiates radical polymerization in response to the action of heat include an organic peroxide, an inorganic peroxide, an organic azo compound, and a diazo compound. Examples of the organic peroxide include benzoyl peroxide, halogenated benzoyl peroxide, lauroyl peroxide, acetyl peroxide, dibutyl peroxide, cumene hydroperoxide, and butyl hydroperoxide. Examples of the inorganic peroxide include hydrogen peroxide, ammonium persulfate, and potassium persulfate. Examples of the organic azo compound include 2-azo-bis-isobutyronitrile, 2-azo-bis-propionitrile, and 2-azo-bis-cyclohexanedinitrile. Examples of the diazo compound include diazoaminobenzene and p-nitrobenzenediazonium.

Examples of a polymerization initiator which initiates radical polymerization in response to the action of light include hydroxyalkylphenones, aminoalkylphenones, acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfoniums.

Examples of the hydroxyalkylphenones include 2-hydroxy-2-methyl-1-phenyl-1-propan-1-one, 1-hydroxy-cyclohexyl phenyl ketone, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methylpropan-1-one, 1-hydroxydimethyl phenyl ketone, and 1-hydroxycyclohexyl phenyl ketone.

Examples of the aminoalkylphenones include 2-dimethylamino-2-(4-methylbenzyl)-1-(4-morpholin-4-yl-phenyl)butan-1-one, 2-benzyl-2-dimethylamino-1-(4-morpholinophenyl)-butanone-1, and 2-methyl-1-(4-methylthiophenyl)-2-morpholinopropan-1-one.

Examples of the acetophenones include 2,2-diethoxyacetophenone, and p-dimethylacetophenone.

Examples of the benzoins include benzoin benzenesulfonic acid ester, benzoin toluenesulfonic acid ester, benzoin methyl ether, benzoin ethyl ether, and benzoin isopropyl ether.

Examples of the benzophenones include benzophenone, 2,4-dichlorobenzophenone, 4,4-dichlorobenzophenone, and p-chlorobenzophenone.

Examples of the phosphine oxides include 2,4,6-trimethylbenzoyl diphenylphosphine oxide.

Further, a sensitizing dye may be used in combination with the above mentioned polymerization initiators.

The content of the polymerization initiator is not particularly limited, but it is preferably from 0.1 to 15% by mass, more preferably from 0.5 to 10% by mass, and particularly preferably from 2 to 5% by mass, with respect to the total solid content of the curable composition.

The curable composition may further contain other additional components, if necessary. Examples of additional components include an inorganic oxide particle, a silicone-based or fluorine-based anti-fouling agent, a lubricant, a polymerization inhibitor, a silane coupling agent, a surfactant, a thickener, and a leveling agent.

The content of the additional component(s) is preferably in a range from 0 to 30 mass %, more preferably in a range from 0 to 20 mass %, and particularly preferably in a range from 0 to 10 mass %, with respect to the total solid of the curable resin composition.

The thickness of the hydrophobic insulation film is not particularly limited, but is preferably from 50 nm to 10 μm, and more preferably from 100 nm to 1 μm. When the thickness of the hydrophobic insulation film is in the above ranges, it is preferable in view of a balance between insulating property and driving voltage.

Method of Forming Hydrophobic Insulation Film

The hydrophobic insulation film may be formed favorably according to the following method. Namely, the method includes:

forming a curable layer (i.e., curable layer forming step) by applying a curable composition containing a polyfunctional compound onto the surface of a substrate 11 on which electroconductivity has been provided (e.g., in the present embodiment, the surface of the electroconductive film 11b of the substrate 11); and curing the thus-formed curable layer (i.e., curing step) by polymerizing the polyfunctional compound in the curable layer. By such a method, a hydrophobic insulation film having a cross-linked structure may be formed.

In a case of forming a hydrophobic insulation film 20 as a curable layer on the substrate 11, a known coating method or transfer method may be employed.

In a case of a coating method, a curable layer is formed by coating a curable composition on the substrate 11 (and preferably followed by drying). Examples of the coating method includes known coating methods such as a spin coating method, a slit coating method, a dip coating method, an air-knife coating method, a curtain coating method, a roller coating method, a wire bar coating method, a gravure coating method, or an extrusion coating method.

In a case of a transfer method, a transfer material having a curable layer formed using a curable composition is prepared in advance, and then the curable layer on the transfer material is transferred onto the substrate 11, to thereby form a curable layer on the substrate 11. The details of the transfer method may be disclosed, for example, in Paragraphs 0094 to 0121 of JP-A No. 2008-202006, Paragraphs 0076 to 0090 of JP-A No. 2008-139378, or the like.

Curing of the curable layer (i.e., polymerization of the polyfunctional compound) may be carried out, for example, by applying at least one of irradiation with an active energy ray (hereinafter referred to also as "light exposure" or "exposure") or heating.

Examples of active energy ray to be used preferably for the exposure include ultraviolet ray (g-line, h-line, i-line, etc.), electron ray, and X ray. The exposure may be performed using a known exposure apparatus of a proximity type, a mirror projection type, a stepper type, or the like. The amount of light for exposure may be from 10 mJ/cm² to 2,000 mJ/cm², and preferably from 50 mJ/cm² to 1,000 mJ/cm².

A hydrophobic insulation film having a desired pattern may be obtained by an exposure through a particular photomask, followed by developing using a developer such as an alkali solution.

The heating may be performed by a known process using, for example, a hot plate or an oven. The heating temperature may be selected appropriately, for example, from 100° C. to 280° C., and preferably is from 150° C. to 250° C. The heating time may be also selected appropriately, for example, from 2 minutes to 120 minutes, and preferably from 5 minutes to 60 minutes.

In the present embodiment, a hydrophilic liquid 14 and an oil 16 are injected between the hydrophobic insulation film 20 and the substrate 12.

Figure 2:
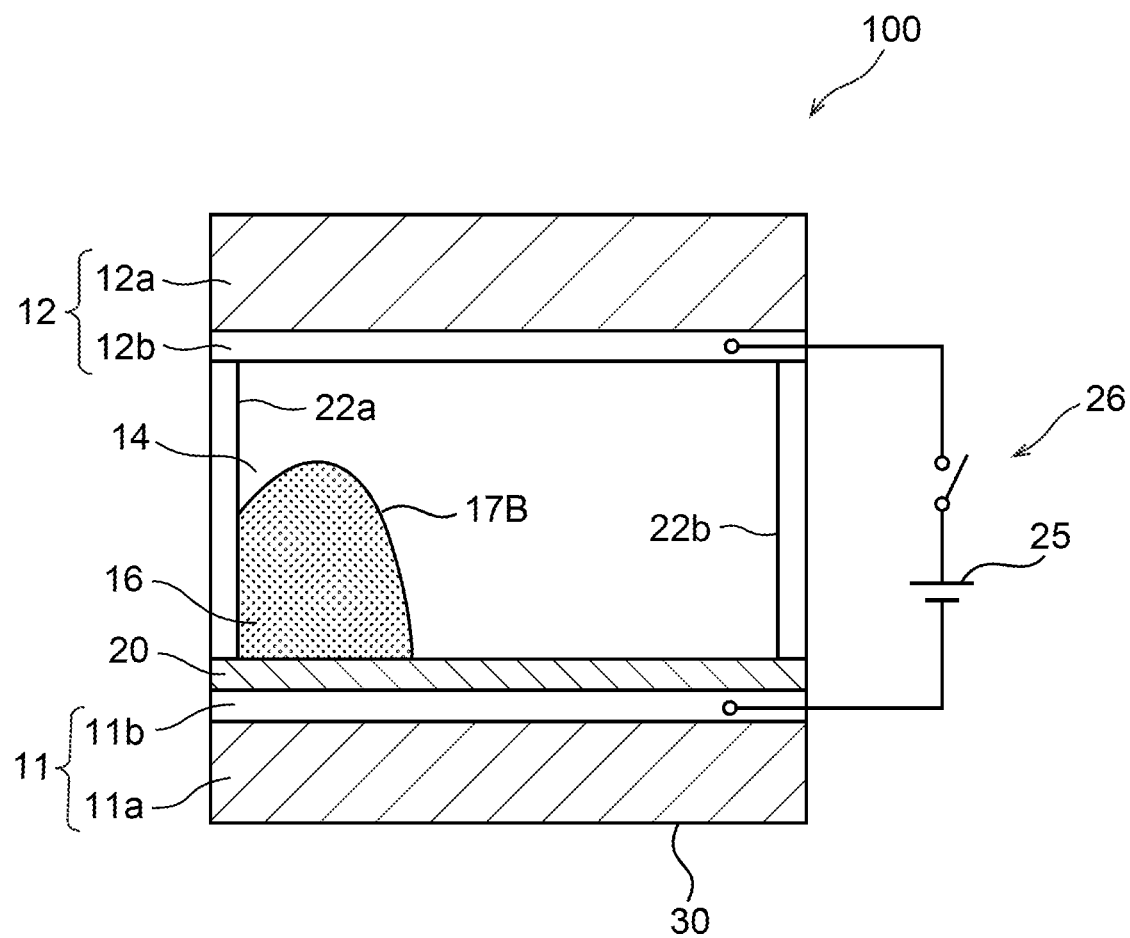
FIG. 2 is a schematic cross-sectional view showing an electrowetting display apparatus according to an exemplary embodiment of the present invention in the voltage-on state.

The hydrophilic liquid 14 and the oil 16 are liquids which are not miscible to each other, and present separately from each other bounded by an interface 17A or an interface 17B as shown in FIG. 1 and FIG. 2. In FIG. 1 and FIG. 2, the interface 17A indicates an interface between the hydrophilic liquid 14 and the oil 16 in a voltage-off stage, and the interface 17B indicates an interface between the hydrophilic liquid 14 and the oil 16 in a voltage-on stage.

The oil 16 is a non-electroconductive liquid that contains at least a non-polar solvent and a colorant described below, and it is preferable the content of the colorant is 10% by mass or more with respect to the total oil composition.

The oil is colored by the colorant contained therein. When the content of the colorant is 10 mass % or more, or preferably equal to or larger than 20 mass %, an image having a high contrast ratio and excellent discernibility and clearness is obtained. In case of a formulation containing a colorant at such a concentration, the responsiveness of the oil at the time in which a voltage is applied tends to be low, and the image display property tends to deteriorate. However, according to the present invention, by containing the colorant described below, the responsiveness of the oil is improved, and the backflow at the time in which a voltage is applied is suppressed, whereby an electrowetting display apparatus having superior image display properties is obtained.

The term "non-electroconductive" means a property with a specific resistance of $10^6$ Ω·cm or higher, and preferably $10^7$ Ω·cm or higher.

The oil preferably has a relatively low relative dielectric constant. The relative dielectric constant of the oil is preferably not more than 10.0, and more preferably in a range from 2.0 to 10.0. It is preferable that the relative dielectric constant is in the above ranges because, as compared to a case in which the relative dielectric constant exceeds 10.0, a higher response speed is attained, and driving (operation) at a lower voltage is possible.

The relative dielectric constant is a value determined based on the electric capacitance obtained by: charging an oil into a glass cell having a cell gap of 10 μm provided with an ITO transparent electrode; and measuring the electric capacitance of the thus-prepared cell using a Model 2353LCR meter (measurement frequency: 1 kHz) (trade name; manufactured by NF Corporation) at 20° C. and 40% RH.

The viscosity of the oil in terms of dynamic viscosity at 25° C. is preferably 10 mPa·s or less. In particular, the viscosity is preferably 0.01 mPa·s or higher, and more preferably from 0.01 mPa·s to 5 mPa·s. It is preferable that the viscosity of the oil is 10 mPa·s or less, because a higher response speed is attained, and driving at a lower voltage is possible, as compared to a case in which the viscosity exceeds 10 mPa·s. Herein, the dynamic viscosity of the oil is the value determined using a viscometer (e.g., Model 500 (trade name), manufactured by Toki Sangyo Co., Ltd.) with the temperature of the oil adjusted to 25° C.

It is preferable that the oil is substantially not miscible with the hydrophilic liquid described below. Specifically, the solubility (25° C.) of the oil in the hydrophilic liquid is preferably 0.1 mass % or less, more preferably 0.01 mass % or less, and particularly preferably 0.001 mass % or less.

Non-Polar Solvent

The oil 16 includes at least one non-polar solvent. The non-polar solvent means a solvent having a low relative dielectric constant (i.e., a so-called non-polar solvent). Examples of the non-polar solvent include: an aliphatic hydrocarbon solvent (preferably an aliphatic hydrocarbon solvent having 6 to 30 carbon atoms) such as n-hexane, n-decane, dodecane, tetradecane, or hexadecane; a solvent obtained by substituting the aliphatic hydrocarbon solvent with fluorine, such as a fluorocarbon oil; and a silicone solvent such as a silicone oil. Among these, an aliphatic hydrocarbon solvent is preferable.

The dissolved oxygen concentration in a nonpolar solvent is preferably not more than 10 ppm. When the dissolved oxygen concentration exceeds 10 ppm, deterioration tends to occur, and the responsiveness tends to decrease. It is preferable that the dissolved oxygen concentration is as low as possible, and 8 ppm or less is particularly preferable.

The content of the nonpolar solvent in the oil is preferably 30 mass % or more, and more preferably 40 mass % or more, with respect to the total amount of the oil. When the content of the nonpolar solvent is 30 mass % or more, a superior optical shutter property is attained, and the solubility of a dye contained in the oil is kept well.

The oil may further contain a solvent other than the nonpolar solvent. In this case, the proportion of the nonpolar solvent in the oil is preferably 70 mass % or more, and more preferably 90 mass % or more, with respect to the total amount of the solvents contained in the oil.

Coloring Material

From the viewpoint of displaying a color image, for example, the oil (for example, the oil 16) in the present invention contains, as a coloring material, at least one azamethine-based colorant containing two colorant mother nuclei bonded via a linking group represented by =N— (which is hereinafter also referred to as "an azamethine colorant in the present invention" or "an azamethine colorant").

In this case, the responsiveness during the image display is improved as well as a back-flow phenomenon is prevented. The reason why the back-flow phenomenon is prevented is presumed to be that the relative dielectric constant of the azamethine-based colorant is low.

In addition, since the azamethine-based colorant exhibits a high molar extinction coefficient, the optical density (OD) of the oil and electrowetting display apparatus is improved.

However, the coloring material contained in the oil in the present invention is not limited to the azamethine-based colorant, and at least one selected from, for example, colorants (that may be the azamethine colorants or colorants other than the azamethine colorants) that have a molar extinction coefficient in the maximum absorption wavelength of 20,000 or more and a relative dielectric constant of 5.1 or less may be used.

Hereinafter, the colorant which may be contained as a coloring material in the oil 16 is referred to as a "colorant in the present invention".

The colorant (for example, the azamethine colorant, which shall apply hereinafter) in the present invention is suitably selected from those having solubility in a non-polar solvent.

The molar extinction coefficient in the maximum absorption wavelength of the colorant in the present invention is preferably 20,000 or more, more preferably 30,000 or more, even more preferably 40,000 or more, and particularly preferably 50,000 or more. A molar extinction coefficient of 20,000 or more is preferred from the viewpoint that both of a high display performance and a high responsiveness are satisfied.

In the present invention, the maximum absorption wavelength denotes a maximum absorption wavelength in a visible light region (from 380 nm to 770 nm).

Furthermore, the relative dielectric constant of the colorant in the present invention is preferably 10.0 or less, more preferably 7.0 or less, and particularly preferably 5.1 or less, from the viewpoint of preventing the back-flow.

Herein, the relative dielectric constant of the colorant denotes a relative dielectric constant (calculated value) at a colorant concentration of 100%, as determined by extrapolating a straight line (calibration curve) indicating the relationship between the colorant concentration and the relative dielectric constant in a diluted colorant solution.

An equivalent parallel capacitance when a measurement frequency 1 kHz and a measurement voltage of 1.0 V are applied is measured in the state in which a diluted colorant solution is sandwiched between two electrodes facing each other with an electrode interval of 10 μm, and the relative dielectric constant of the diluted colorant solution is calculated by the following equation, based on the equivalent parallel capacitance thus obtained.

Relative dielectric constant of diluted colorant solution=Equivalent parallel capacitance×Electrode interval/Electrode area/Dielectric constant of vacuum ($\in_0$)

The azamethine colorant is not particularly limited as long as it includes a structure having two colorant mother nuclei linked via a linking group represented by =N— and has solubility in a non-polar solvent. As the azamethine colorant, a known azamethine-based dye may be arbitrarily selected and used.

The colorant in the present invention is preferably one having a solubility in n-hexane at 25° C. and 0.1 MPa of 1% by mass or more, more preferably one having a superior solubility in a non-polar solvent, and particularly preferably one having a superior solubility in a hydrocarbon-based solvent, in view of the responsiveness of the oil phase when a voltage is applied thereto. When the solubility is 1% by mass or more, the colorant is more suitable for an electrowetting display apparatus.

Furthermore, the "solubility in n-decane at 25° C. and 0.1 MPa" is hereinafter also simply referred to as "solubility".

When the colorant in the present invention is applied in an oil that is a member for display to prepare a display apparatus operating in a principle of an electrowetting method, the solubility is more preferably 3% by mass or more, and even more preferably 5% by mass or more. A higher solubility is more preferred, but its upper limit is usually about 80% by mass.

The molecular weight of the colorant in the present invention is preferably 200 or more and less than 3,000, and more preferably 200 or more and less than 2,000. When the molecular weight is 200 or more, the solubility in a non-polar solvent is ensured, whereas when the solubility is less than 3,000, the solubility in the non-polar solvent is maintained at a level not impairing the responsiveness during the image display.

For the oil, the coloring materials may be used singly or in combination of two or more kinds thereof. For example, the oil in the present invention may include one coloring material in the present invention, or may include two or more colorants in the present invention.

The total amount of the coloring material including the colorant in the present invention contained in the oil is preferably 10% by mass or more with respect to the total amount of the oil. The content of the coloring material (particularly, the colorant in the present invention) (or the total content when plural coloring materials are used) is preferably 20% by mass or more, more preferably 40% by mass or more, and even more preferably 50% by mass or more, with respect to the total amount of the oil, from the viewpoints of improving the density and distinctiveness of a display image, and the like. When the content of the coloring material in the oil is increased, the responsiveness of the oil when a voltage is applied is decreased as well as the back-flow phenomenon in the voltage application state is deteriorated and the image display property tends to deteriorate. As a result, particularly, in an oil composition in which the content of the coloring material is 10% by mass or more (preferably 20% by mass or more), the effect of the present invention is more clearly exhibited. In addition, the total amount of the coloring material is preferably 70% by mass or less, more preferably 65% by mass or less, and even more preferably 60% by mass or less, with respect to the total amount of the oil, from the viewpoint of increasing the response speed. In particular, a case in which the content of the azamethine colorant in the present invention in the oil is 5% by mass or more is more preferred. Examples of the colorant other than the azamethine colorant in the present invention, which may be contained in the oil include a methine colorant, an azomethine colorant, an azo colorant, anthraquinone, phthalocyanine, and porphyrin, but the invention are not particularly limited thereto.

The concentration (C) of the colorant in the colored composition (oil) may be controlled to an arbitrary concentration, depending on the purpose. When being used as a colorant for electrowetting display, the colorant is usually used after dilution to a concentration of 0.2% by mass or more, depending on a desired EC value (in which $\in$ is a molar extinction coefficient of the colorant).

The molar extinction coefficient in the maximum absorption wavelength of the azamethine colorant in the present invention is not particularly limited, but the molar extinction coefficient is preferably 20,000 or more, more preferably 30,000 or more, even more preferably 40,000 or more, and particularly preferably 50,000 or more. A molar extinction coefficient of 20,000 or more is preferred in view of satisfying both of a high display performance and a high responsiveness.

Furthermore, the relative dielectric constant of the azamethine colorant is not particularly limited, but the relative dielectric constant is preferably 5.1 or less, more preferably 4.6 or less, and particularly preferably 3.5 or less, from the viewpoint of additionally preventing the back-flow.

It is particularly preferable that the azamethine colorant have a molar extinction coefficient in the maximum absorption wavelength of 20,000 or more and a relative dielectric constant of 5.1 or less.

A higher OD (optical density) value of the electrowetting display apparatus of the present invention leads to further improvement in the density and the distinctiveness of the image. Accordingly, the OD value of the colorant in the maximum absorption wavelength is preferably OD=0.5 μm or more, more preferably 0.8 μm or more, and even more preferably 1.0 μm or more, per thickness of the oil layer.

The colorant in the present invention is preferably a compound containing no metal atom in the molecule thereof. In this case, the colorant in the present invention does not encompass a colorant compound including a metal atom or a metal compound, forming a complex. In the present invention, it is preferable that the colorant do not contain a metal atom in the molecule from the viewpoint of the solubility of the coloring material, and from the viewpoint of obtaining transparency of the display device. The colorant having such a structure has advantages in that it has a high solubility in a non-polar solvent and little adsorption onto a substrate such as glass, and remaining colors due to the colorant in the oil is less likely to be generated.

Specifically, it is preferable that the azamethine colorant in the present invention do not contain, for example, a complex in which a colorant represented by any one of Formulae (1) to (3) as described below is coordinated to a metal or a compound thereof.

The azamethine colorant in the present invention is preferably a colorant represented by the following Formula (1). This colorant has a structure in which two colorant mother nuclei are bonded via a linking group represented by =N— and has no dissociable group. As a result, the colorant has a good solubility in a non-polar solvent (particularly, a hydrocarbon-based solvent), and when it is applied to a display apparatus operating in a principle of an electrowetting method to display an image, the responsiveness and the back-flow characteristics are excellent. The colorant is preferable in that excellent responsiveness is exhibited and the back-flow ratio is kept low even when the colorant is used for forming a solution (oil) obtained by adding the colorant in an amount of 10% by mass or more to a non-polar solvent. When using an electrowetting method, generally, a higher limit value of the colorant concentration exhibiting excellent responsiveness and back-flow ratio is more preferred.

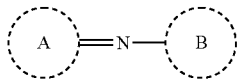

Formula (1)

The azamethine-based colorant represented by Formula (1) is a colorant having no dissociable group (not including a NH group) such as —SO$_3$H, —PO$_3$H$_2$, —CO$_2$H, or —OH in the molecule thereof, and exhibits good solubility in a non-polar solvent. From the viewpoint of a superior solubility in a non-polar solvent, the colorant preferably has a linear or branched alkyl group having 4 to 30 carbon atoms in the molecule thereof. By such a structural characteristics, the colorant represented by Formula (1) has an SP value (solubility parameter) close to an SP value of the non-polar solvent, which is presumed to have an improved mixing property. When the azamethine colorant in the present invention has a linear or branched alkyl group in the molecule thereof, the alkyl group is more preferably a linear or branched alkyl group having 6 to 16 carbon atoms for the same reason above.

From the viewpoint of increasing the solubility, the total number of carbon atoms of the alkyl group(s) included in the molecule of the azamethine colorant in the present application is preferably from 10 to 200, and more preferably from 30 to 100.

In Formula (1), A and B each independently represent a colorant mother nucleus having no dissociable group. In this colorant, as represented by Formula (1), A and B representing the colorant mother nuclei are linked via a linking group represented by =N—.

The colorant mother nuclei represented by A and B are each a molecular structure (chromophore or maternal skeleton) required for color development. That is, the colorant mother nuclei are each a partial structure formed by continuous unsaturated bonds in the compound (a partial structure required for forming a conjugated system), and examples thereof include structural moieties linked with >C=C<, >C=O, >C=N—, >N=N<, or the like. Specific examples of the colorant mother nuclei include a pyrrole skeleton, an azepine skeleton, an isoxazolone skeleton, a pyrazolone skeleton, a pyrazolotriazole skeleton, a pyrrolotriazole skeleton, a benzoquinone skeleton, a naphthoquinone skeleton, a pyridone skeleton, a barbituric skeleton, a pyrimidine skeleton, a thiobarbituric skeleton, and an anilide skeleton.

A and B may be the same as or different from each other, but from the viewpoint of expressing good responsiveness, A and B preferably have the same skeletons.

Specifically, as the colorant mother nuclei, molecule skeletons including 5- to 7-membered hydrocarbon rings or 5- to 7-membered heterocycles are preferred. Examples of the hydrocarbon ring or the heterocycle include a pyrazole ring, an isoxazole ring, a pyrazolotriazole ring, a pyrrolotriazole ring, a naphthalene ring, a pyridone ring, a barbituric ring, a thiobarbituric ring, a pyrimidine ring, a pyrrole ring, and an azepine ring.

Among these, at least one of A and B representing colorant mother nuclei is preferably a heterocycle including one or more nitrogen atoms.

As the A and B, among those above, a pyrrole ring, an azepine ring, a pyrazole ring, an isoxazole ring, a pyrazolotriazole ring, a pyrrolotriazole ring, and a naphthalene ring are preferred.

Among these, from the viewpoint of further increasing the molar extinction coefficient of the azamethine colorant, a pyrrole ring is preferred.

In addition, from the viewpoint of further improving the responsiveness and further increasing the molar extinction coefficient, it is preferable that each of A and B has a pyrrole ring.

The ring represented by A or B may be unsubstituted or substituted. When A or B is substituted, the substituent therefor has the same definitions as the "monovalent substituents" represented by $R^1$ to $R^6$ in Formula (3) as described below, and preferable exemplary embodiments thereof are also the same.

Among the colorants represented by Formula (1), a colorant represented by the following Formula (2) is preferred.

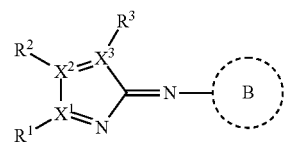

Formula (2)

In Formula (2), $R^1$, $R^2$, and $R^3$ each independently represent a hydrogen atom or a monovalent substituent. The monovalent substituent represented by $R^1$, $R^2$, or $R^3$ has the same definitions as the "monovalent substituent" represented by $R^1$ to $R^6$ in Formula (3) as described below, and preferable exemplary embodiments thereof are also the same.

Among these, from the viewpoint of improving the solubility in a non-polar solvent, at least one of $R^1$, $R^2$, and $R^3$ is preferably a linear or branched alkyl group having 4 to 30 carbon atoms, having preferably 6 to 30 carbon atoms, and more preferably having 6 to 16 carbon atoms.

In Formula (2), $X^1$, $X^2$, and $X^3$ each independently represent a carbon atom or nitrogen atom. However, when $X^1$ represents a nitrogen atom, $R^1$ is not present; when $X^2$ represents a nitrogen atom, $R^2$ is not present; and when $X^3$ represents a nitrogen atom, $R^3$ is not present.

In Formula (2), B represents a colorant mother nucleus having no dissociable group. The colorant mother nucleus represented by B has the same definition as the colorant mother nuclei represented by B in Formula (1), and preferable exemplary embodiment thereof is also the same.

Among the azamethine colorants represented by Formulae (1) to (2), from the viewpoint of further improving the responsiveness and further increasing the molar extinction coefficient, an azamethine colorant represented by the following Formula (3) is preferred.

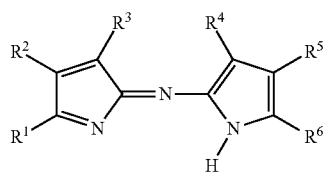

Formula (3)

In Formula (3), $R^1$, $R^2$, $R^3$, $R^4$, $R^5$, and $R^6$ each independently represent a hydrogen atom or a monovalent substituent. From the viewpoint of increasing the solubility in a non-polar solvent, the "monovalent substituent" may preferably be as hydrophobic as possible. Specifically, it is preferable that the proportion of alkyl groups be high, and it is more preferable that the alkyl groups have no ring.

Examples of the monovalent substituent represented by $R^1$ to $R^6$ include:

halogen atoms such as a fluorine atom, a chlorine atom, or a bromine atom;

alkyl groups which are preferably linear, branched, or cyclic alkyl groups having 1 to 48 carbon atoms, and more preferably linear, branched, or cyclic alkyl groups having 1 to 24 carbon atoms, specific examples of which include a methyl group, an ethyl group, a propyl group, an isopropyl group, a butyl group, a t-butyl group, a pentyl group, a hexyl group, a heptyl group, an octyl group, a 2-ethylhexyl group, a dodecyl group, a hexadecyl group, a cyclopropyl group, a cyclopentyl group, a cyclohexyl group, a 1-norbornyl group, and a 1-adamantyl group;

alkenyl groups which are preferably alkenyl groups having 2 to 48 carbon atoms, and more preferably alkenyl groups having 2 to 18 carbon atoms, specific examples of which include a vinyl group, an allyl group, and a 3-buten-1-yl group;

aryl groups which are preferably aryl groups having 6 to 48 carbon atoms, and more preferably aryl groups having 6 to 24 carbon atoms, specific examples of which include a phenyl group and a naphthyl group;

heterocyclic groups which are preferably heterocyclic groups having 1 to 32 carbon atoms, and more preferably 1 to 18 carbon atoms, specific examples of which include a 2-thienyl group, a 4-pyridyl group, a 2-furyl group, a 2-pyrimidinyl group, a 1-pyridyl group, a 2-benzothiazolyl group, a 1-imidazolyl group, a 1-pyrazolyl group, and a benzotriazol-1-yl group;

silyl groups which are preferably silyl groups having 3 to 38 carbon atoms, and more preferably silyl groups having 3 to 18 carbon atoms, specific examples of which include a trimethylsilyl group, a triethylsilyl group, a tributylsilyl group, a t-butyldimethylsilyl group, and a t-hexyldimethylsilyl group;

a hydroxyl group;

a cyano group;

a nitro group;

alkoxy groups which are preferably alkoxy groups having 1 to 48 carbon atoms, and more preferably alkoxy groups having 1 to 24 carbon atoms, specific examples of which include a methoxy group, an ethoxy group, a 1-butoxy group, a 2-butoxy group, an isopropoxy group, a t-butoxy group, a dodecyloxy group, and a cycloalkyloxy group (for example, a cyclopentyloxy group or a cyclohexyloxy group);

aryloxy groups which are preferably aryloxy groups having 6 to 48 carbon atoms, and more preferably aryloxy groups having 6 to 24 carbon atoms, specific examples of which include a phenoxy group and a 1-naphthoxy group;

heterocyclic oxy groups which are preferably heterocyclic oxy groups having 1 to 32 carbon atoms, and more preferably heterocyclic oxy groups having 1 to 18 carbon atoms, specific examples of which include a 1-phenyltetrazol-5-oxy group and a 2-tetrahydropyranyloxy group;

silyloxy groups which are preferably silyloxy groups having 1 to 32 carbon atoms, and more preferably silyloxy groups having 1 to 18 carbon atoms, specific examples of which include a trimethylsilyloxy group, a t-butyldimethylsilyloxy group, and a diphenylmethylsilyloxy group;

acyloxy groups which are preferably acyloxy groups having 2 to 48 carbon atoms, and more preferably acyloxy groups having 2 to 24 carbon atoms, specific examples of which include an acetoxy group, a pivaloyloxy group, a benzoyloxy group, and a dodecanoyloxy group;

alkoxycarbonyloxy groups which are preferably alkoxycarbonyloxy groups having 2 to 48 carbon atoms, and more preferably alkoxycarbonyloxy groups having 2 to 24 carbon atoms, specific examples of which include an ethoxycarbonyloxy group, a t-butoxycarbonyloxy group, and a cycloalkyloxycarbonyloxy group (for example, a cyclohexyloxycarbonyloxy group);

aryloxycarbonyloxy groups which are preferably aryloxycarbonyloxy groups having 7 to 32 carbon atoms, and more preferably aryloxycarbonyloxy groups having 7 to 24 carbon atoms, specific examples of which include a phenoxycarbonyloxy group;

carbamoyloxy groups which are preferably carbamoyloxy groups having 1 to 48 carbon atoms, and more preferably carbamoyloxy groups having 1 to 24 carbon atoms, specific examples of which include an N,N-dimethylcarbamoyloxy group, an N-butylcarbamoyloxy group, an N-phenylcarbamoyloxy group, and an N-ethyl-N-phenylcarbamoyloxy group;

sulfamoyloxy groups which are preferably sulfamoyloxy groups having 1 to 32 carbon atoms, and more preferably sulfamoyloxy groups having 1 to 24 carbon atoms, specific examples of which include an N,N-diethylsulfamoyloxy group and an N-propylsulfamoyl oxy group;

alkylsulfonyloxy groups which are preferably alkylsulfonyloxy groups having 1 to 38 carbon atoms, and more preferably alkylsulfonyloxy groups having 1 to 24 carbon atoms, specific examples of which include a methylsulfonyloxy group, a hexadecylsulfonyloxy group, and a cyclohexylsulfonyloxy group;

arylsulfonyloxy groups which are preferably arylsulfonyloxy groups having 6 to 32 carbon atoms, and more preferably arylsulfonyloxy groups having 6 to 24 carbon atoms, specific examples of which include a phenylsulfonyloxy group;

acyl groups which are preferably acyl groups having 1 to 48 carbon atoms, and more preferably acyl groups having 1 to 24 carbon atoms, specific examples of which include a formyl group, an acetyl group, a pivaloyl group, a benzoyl group, a tetradecanoyl group, and a cyclohexanoyl group;

alkoxycarbonyl groups which are preferably alkoxycarbonyl groups having 2 to 48 carbon atoms, and more preferably alkoxycarbonyl groups having 2 to 24 carbon atoms, specific examples of which include a methoxycarbonyl group, an ethoxycarbonyl group, an octadecyloxycarbonyl group, a cyclohexyloxycarbonyl group, and a 2,6-di-tert-butyl-4-methylcyclohexyloxycarbonyl group;

aryloxycarbonyl groups which are preferably aryloxycarbonyl groups having 7 to 32 carbon atoms, and more preferably aryloxycarbonyl groups having 7 to 24 carbon atoms, specific examples of which include a phenoxycarbonyl group;

carbamoyl groups which are preferably carbamoyl groups having 1 to 48, and more preferably carbamoyl groups having 1 to 24 carbon atoms, specific example of which include a carbamoyl group, an N,N-diethylcarbamoyl group, an N-ethyl-N-octylcarbamoyl group, an N,N-dibutylcarbamoyl group, an N-propylcarbamoyl group, an N-phenylcarbamoyl group, an N-methyl-N-phenylcarbamoyl group, and an N,N-dicyclohexylcarbamoyl group;

amino groups which are preferably amino groups having 32 or less carbon atoms, and more preferably amino groups having 24 or less carbon atoms, specific example of which include an amino group, a methylamino group, an N,N-dibutylamino group, a tetradecylamino group, a 2-ethylhexylamino group, and a cyclohexylamino group;

anilino groups which are preferably anilino groups having 6 to 32 carbon atoms, and more preferably anilino groups having 6 to 24 carbon atoms, specific example of which include an anilino group and an N-methylanilino group;

heterocyclic amino groups which are preferably heterocyclic amino groups having 1 to 32 carbon atoms, and more preferably heterocyclic amino groups having 1 to 18 carbon atoms, specific example of which include a 4-pyridylamino group;

carbonamido groups which are preferably carbonamido groups having 2 to 48 carbon atoms, and more preferably carbonamido groups having 2 to 24 carbon atoms, specific example of which include an acetamido group, a benzamido group, a tetradecaneamido group, a pivaloylamido group, and a cyclohexaneamido group;

ureido groups which are preferably ureido groups having 1 to 32 carbon atoms, and more preferably ureido groups having 1 to 24 carbon atoms, specific example of which include an ureido group, an N,N-dimethylureido group, and an N-phenylureido group;

imido groups which are preferably imido groups having 36 or less carbon atoms, and more preferably imido groups having 24 or less carbon atoms, specific example of which include an N-succinimido group and an N-phthalimido group;

alkoxycarbonylamino groups which are preferably alkoxycarbonylamino groups having 2 to 48 carbon atoms, and more preferably alkoxycarbonylamino groups having 2 to 24 carbon atoms, specific example of which include a methoxycarbonylamino group, an ethoxycarbonylamino group, a t-butoxycarbonylamino group, an octadecyloxycarbonylamino group, and a cyclohexyloxycarbonylamino group;

aryloxycarbonylamino groups which are preferably aryloxycarbonylamino groups having 7 to 32 carbon atoms, and more preferably aryloxycarbonylamino groups having 7 to 24 carbon atoms, specific example of which include a phenoxycarbonylamino group;

sulfonamido groups which are preferably sulfonamido groups having 1 to 48 carbon atoms, and more preferably sulfonamido groups having 1 to 24 carbon atoms, specific example of which include a methanesulfonamido group, a butanesulfonamido group, a benzenesulfonamido group, a hexadecanesulfonamido group, and a cyclohexanesulfonamido group;

sulfamoylamino groups which are preferably sulfamoylamino groups having 1 to 48 carbon atoms, and more preferably a sulfamoylamino groups having 1 to 24 carbon atoms, specific example of which include an N,N-dipropylsulfamoylamino group and an N-ethyl-N-dodecylsulfamoylamino group;

azo groups which are preferably azo groups having 1 to 32 carbon atoms, and more preferably azo groups having 1 to 24 carbon atoms, specific example of which include a phenylazo group and a 3-pyrazolylazo group;

alkylthio groups which are preferably alkylthio groups having 1 to 48 carbon atoms, and more preferably alkylthio groups having 1 to 24 carbon atoms, specific example of which include a methylthio group, an ethylthio group, an octylthio group, and a cyclohexylthio group;

arylthio groups which are preferably arylthio groups having 6 to 48 carbon atoms, and more preferably arylthio groups having 6 to 24 carbon atoms, specific example of which include a phenylthio group;

heterocyclic thio groups which are preferably heterocyclic thio groups having 1 to 32 carbon atoms, and more preferably heterocyclic thio groups having 1 to 18 carbon atoms, specific example of which include a 2-benzothiazolylthio group, a 2-pyridylthio group, and a 1-phenyltetrazolylthio group;

alkylsulfinyl groups which are preferably alkylsulfinyl groups having 1 to 32 carbon atoms, and more preferably alkylsulfinyl groups having 1 to 24 carbon atoms, specific example of which include a dodecanesulfinyl group;

arylsulfinyl groups which are preferably arylsulfinyl groups having 6 to 32 carbon atoms, and more preferably arylsulfinyl groups having 6 to 24 carbon atoms, specific example of which include a phenylsulfinyl group;

alkylsulfonyl groups which are preferably alkylsulfonyl groups having 1 to 48 carbon atoms, and more preferably alkylsulfonyl groups having 1 to 24 carbon atoms, specific example of which include a methylsulfonyl group, an ethylsulfonyl group, a propylsulfonyl group, a butylsulfonyl group, an isopropylsulfonyl group, a 2-ethylhexylsulfonyl group, a hexadecylsulfonyl group, an octylsulfonyl group, and a cyclohexylsulfonyl group;

arylsulfonyl groups which are preferably arylsulfonyl groups having 6 to 48 carbon atoms, and more preferably arylsulfonyl groups having 6 to 24 carbon atoms, specific example of which include a phenylsulfonyl group and a 1-naphthylsulfonyl group;

sulfamoyl groups which are preferably sulfamoyl groups having 32 or less carbon atoms, and more preferably sulfamoyl groups having 24 or less carbon atoms, specific example of which include a sulfamoyl group, an N,N-dipropylsulfamoyl group, an N-ethyl-N-dodecylsulfamoyl group, an N-ethyl-N-phenylsulfamoyl group, and an N-cyclohexylsulfamoyl group;

a sulfo group;

phosphonyl groups which are preferably phosphonyl groups having 1 to 32 carbon atoms, and more preferably phosphonyl groups having 1 to 24 carbon atoms, specific example of which include a phenoxyphosphonyl group, an octyloxyphosphonyl group, and a phenylphosphonyl group; and phosphinoylamino groups which are preferably phosphinoylamino groups having 1 to 32 carbon atoms, and more preferably phosphinoylamino groups having 1 to 24 carbon atoms, specific example of which include a diethoxyphosphinoylamino group and a dioctyloxyphosphinoylamino group.

When the monovalent substituent is a group capable of being further substituted, it may be further substituted with any one of the above-described groups. Further, when the monovalent substituent has two or more additional substituents, these substituents may be the same as or different from each other.

In Formula (3), $R^1$ and $R^2$, $R^2$ and $R^3$, $R^4$ and $R^5$, or $R^5$ and $R^6$ may be bonded to each other independently to form a 5-, 6-, or 7-membered ring. The ring formed may be a saturated ring or an unsaturated ring. Examples of the 5-, 6-, or 7-membered saturated ring or unsaturated ring include a pyrrole ring, a furan ring, a thiophene ring, a pyrazole ring, an imidazole ring, a triazole ring, an oxazole ring, a thiazole ring, a pyrrolidine ring, a piperidine ring, a cyclopentene ring, a cyclohexene ring, a benzene ring, a pyridine ring, a pyrazine ring, and a pyridazine ring, and preferably a benzene ring and a pyridine ring.

Furthermore, when the 5-, 6-, or 7-membered ring formed is a group that may be further substituted, it may be substituted with any one of the monovalent substituents mentioned above, and when the 5-, 6-, or 7-membered ring formed is a group substituted with two or more additional substituents, the additional substituents may be the same as or different from each other.

Regarding Formula (3), among those, $R^1$ and $R^6$ are each independently preferably an amino group, a carbonamido group, a ureido group, an imido group, an alkoxycarbonylamino group, or a sulfonamido group; more preferably an amino group, a carbonamido group, a ureido group, an alkoxycarbonylamino group, or a sulfonamido group; even more preferably an amino group, a carbonamido group, a ureido group, an alkoxycarbonylamino group, or a sulfonamido group; and particularly preferably an amino group, a carbonamido group, or a ureido group.

Among those, $R^2$ and $R^5$ are each independently preferably an alkoxycarbonyl group, an aryloxycarbonyl group, a carbamoyl group, an alkylsulfonyl group, an arylsulfonyl group, a nitrile group, an imido group, or a carbamoylsulfonyl group; more preferably an alkoxycarbonyl group, an aryloxycarbonyl group, a carbamoyl group, an alkylsulfonyl group, a nitrile group, an imido group, or a carbamoylsulfonyl group; even more preferably an alkoxycarbonyl group, an aryloxycarbonyl group, a carbamoyl group, a nitrile group, an imido group, or a carbamoylsulfonyl group; and particularly preferably an alkoxycarbonyl group, an aryloxycarbonyl group, or a carbamoyl group.

Among those, $R^3$ and $R^4$ are each independently preferably a substituted or unsubstituted alkyl group, a substituted or unsubstituted aryl group, or a substituted or unsubstituted heterocyclic group; and more preferably a substituted or unsubstituted alkyl group, or a substituted or unsubstituted aryl group.

In Formula (3), when $R^3$ and $R^4$ each represent an alkyl group, the alkyl group is preferably a linear, branched, or cyclic substituted or unsubstituted alkyl group having 1 to 12 carbon atoms, and specific examples thereof include a methyl group, an ethyl group, an n-propyl group, an isopropyl group, a cyclopropyl group, an n-butyl group, an i-butyl group, a t-butyl group, a cyclobutyl group, a cyclopentyl group, a cyclohexyl group, and a benzyl group. Among these, the alkyl group is more preferably a branched or cyclic substituted or unsubstituted alkyl group having 1 to 12 carbon atoms, and specific examples thereof include an isopropyl group, a cyclopropyl group, an i-butyl group, a t-butyl group, a cyclobutyl group, a cyclopentyl group, and a cyclohexyl group. The alkyl group is even more preferably a secondary or tertiary substituted or unsubstituted alkyl group having 1 to 12 carbon atoms, and more specifically, for example, an isopropyl group, a cyclopropyl group, an i-butyl group, a t-butyl group, a cyclobutyl group, or a cyclohexyl group.

When $R^3$ and $R^4$ each represent an aryl group, the aryl group is preferably a substituted or unsubstituted phenyl group, or a substituted or unsubstituted naphthyl group, and more preferably a substituted or unsubstituted phenyl group.

When $R^3$ and $R^4$ each represent a heterocyclic group, the heterocyclic group is preferably a substituted or unsubstituted 2-thienyl group, a substituted or unsubstituted 4-pyridyl group, a substituted or unsubstituted 3-pyridyl group, a substituted or unsubstituted 2-pyridyl group, a substituted or unsubstituted 2-furyl group, a substituted or unsubstituted 2-pyrimidinyl group, a substituted or unsubstituted 2-benzothiazolyl group, a substituted or unsubstituted 1-imidazolyl group, a substituted or unsubstituted 1-pyrazolyl group, or a substituted or unsubstituted benzotriazol-1-yl group; and more preferably a substituted or unsubstituted 2-thienyl group, a substituted or unsubstituted 4-pyridyl group, a substituted or unsubstituted 2-furyl group, a substituted or unsubstituted 2-pyrimidinyl group, or a substituted or unsubstituted 1-pyridyl group.

Among those, from the viewpoint of improving the solubility in a non-polar solvent, at least one of $R^1$, $R^2$, $R^3$, $R^4$, $R^5$, and $R^6$, or at least one of $R^1$, $R^2$, and $R^3$ and at least one of $R^4$, $R^5$, and $R^6$ is preferably a linear or branched alkyl group having 4 to 30 carbon atoms, preferably having 6 to 30 carbon atoms, and more preferably having 6 to 16 carbon atoms; and $R^3$ and/or $R^4$ is/are preferably a linear or branched alkyl group having 1 to 30 carbon atoms, and more preferably having 3 to 16 carbon atoms.

For the same reason as mentioned above, it is more preferable that $R^3$ and $R^4$ be each independently a linear or branched alkyl group having 1 to 30 carbon atoms, and preferably having 3 to 16 carbon atoms; and $R^2$ and $R^5$ be each independently an alkoxycarbonyl group having 4 to 24 carbon atoms, or a carbamoyl group having 4 to 24 carbon atoms; and $R^1$ and $R^6$ be each independently a carbamoyl group having 4 to 24 carbon atoms or an amino group having 24 or less carbon atoms.

Specific examples (Exemplary Compounds 1 to 26) of the colorant represented by Formulae (1) to (3) are shown below. However, the present invention is not limited thereto. in the following specific examples, "Me" represents methyl, "Et" represents ethyl, "i-Pr" represents isopropyl, "Bu" represents butyl, "i-Bu" represents isobutyl, and "Ph" represents phenyl, respectively.

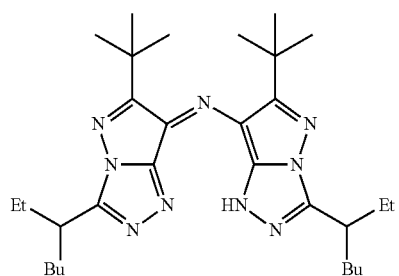
1
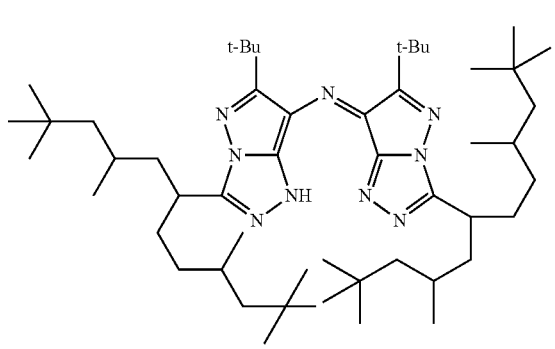
2
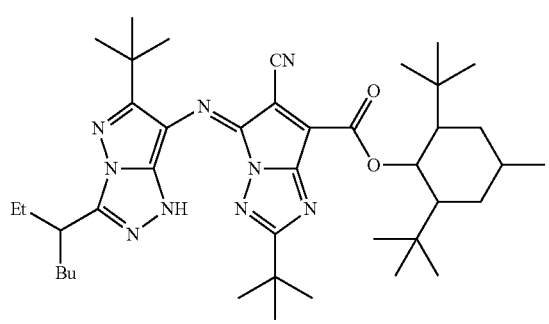
3
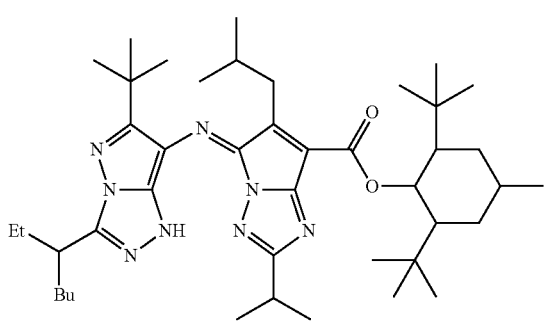
4
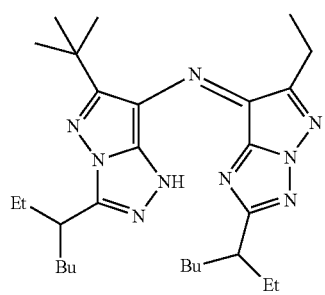
5
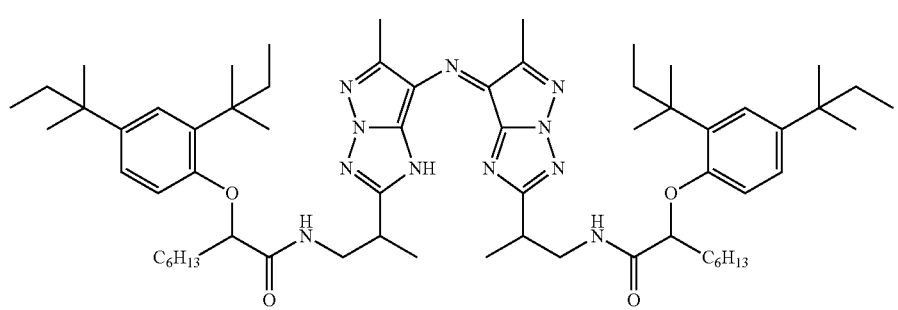
6
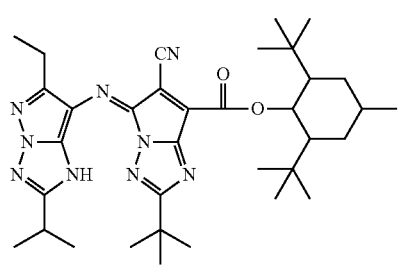
7
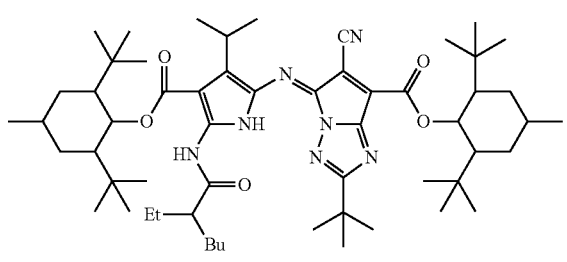
8

-continued
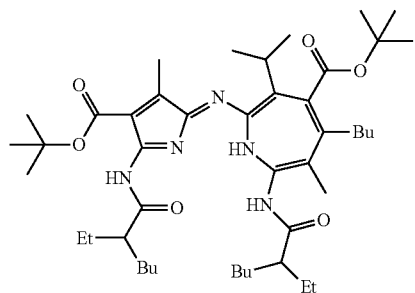
9
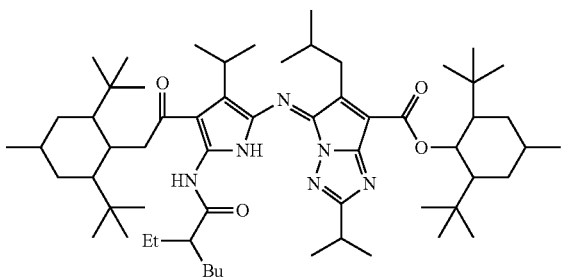
10
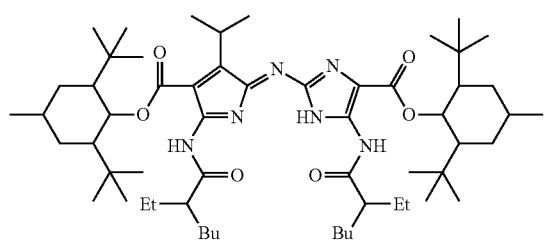
11
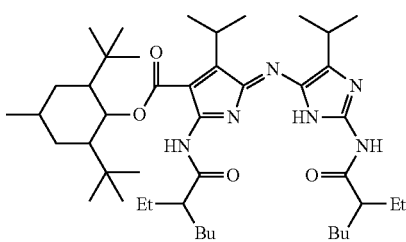
12
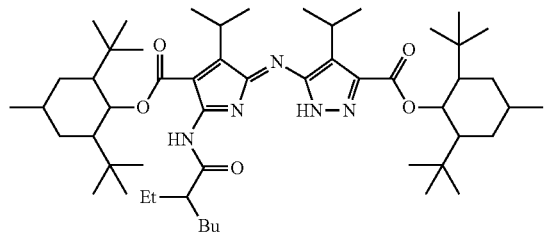
13
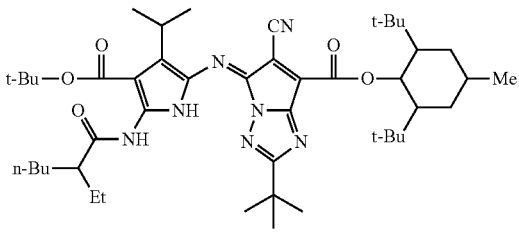
14
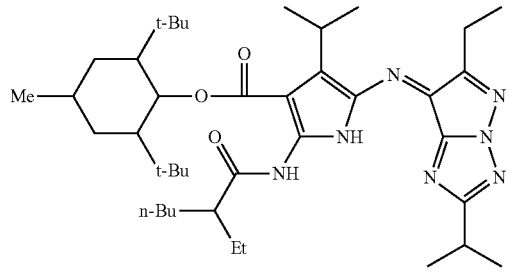
15
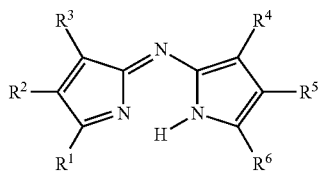
| Exemplary Compound | $R^1$ | $R^2$ | $R^3$ | $R^4$ | $R^5$ | $R^6$ |
|---|---|---|---|---|---|---|
| 16 | 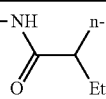 n-Bu Et | 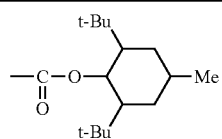 | i-Pr | i-Pr | t-Bu | —$NH_2$ |
|  |  |  |  |  | 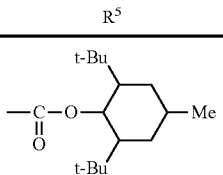 |  |

-continued

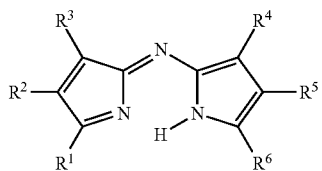

| Exemplary Compound | R¹ | R² | R³ | R⁴ | R⁵ | R⁶ |
|---|---|---|---|---|---|---|
| 17 | −NH−C(=O)−CH(n-Bu)(Et) | −C(=O)−O−(2,6-di-t-Bu-4-Me-cyclohexyl) | i-Pr | i-Pr | −C(=O)−O−(2,6-di-t-Bu-4-Me-cyclohexyl) | −NH−C(=O)−Me |
| 18 | −NH−C(=O)−CH(n-Bu)(Et) | −C(=O)−O−(2,6-di-t-Bu-4-Me-cyclohexyl) | i-Bu | i-Pr | −C(=O)−O−(2,6-di-t-Bu-4-Me-cyclohexyl) | −NH−C(=O)−CH(n-Bu)(Et) |
| 19 | −NH−C(=O)−CH(n-Bu)(Et) | −C(=O)−O−t-Bu | −CH(n-Bu)(Et) | −CH(n-Bu)(Et) | −C(=O)−O−t-Bu | −NH−C(=O)−CH(n-Bu)(Et) |
| 20 | −NH−C(=O)−CH(n-Bu)(Et) | −C(=O)−O−(2,6-di-t-Bu-4-Me-cyclohexyl) | i-Pr | −CH(n-Bu)(Et) | −C(=O)−O−t-Bu | −NH−C(=O)−C(Me)₃ |
| 21 | −NH−C(=O)−CH(n-Bu)(Et) | −C(=O)−NH−CH(n-Bu)(Et) | i-Pr | i-Pr | −C(=O)−NH−CH(n-Bu)(Et) | −NH−C(=O)−CH(n-Bu)(Et) |
| 22 | Ph | −C(=O)−NH−CH(n-Bu)(Et) | i-Pr | i-Pr | −C(=O)−NH−CH(n-Bu)(Et) | Ph |
| 23 | −NH−C(=O)−CH(n-Bu)(Et) | −C(=O)−N(n-Bu)₂ | i-Pr | i-Pr | −C(=O)−N(n-Bu)₂ | −NH−C(=O)−CH(n-Bu)(Et) |
| 24 | −CH(n-Bu)(Et) | −CH(n-Bu)(Et) | −CH(n-Bu)(Et) | −CH(n-Bu)(Et) | −CH(n-Bu)(Et) | −CH(n-Bu)(Et) |
| 25 | −NH−C(=O)−CH(n-Bu)(Et) | −C(=O)−O−(2,6-di-t-Bu-4-Me-cyclohexyl) | i-Pr | −CH(n-Bu)(Et) | −CH(n-Bu)(Et) | −CH(n-Bu)(Et) |
| 26 | −NH−C(=O)−C(Me)₃ | −C(=O)−O−(2,6-di-t-Bu-4-Me-cyclohexyl) | Me | Ph | −C(=O)−O−(2,6-di-t-Bu-4-Me-cyclohexyl) | −NH−C(=O)−C(Me)₃ |

Additives

The oil may further contain, as other components, various additives such as a surfactant, an ultraviolet absorber, or an antioxidant, if necessary. When the oil contains an additive, the content of the additive is not particularly limited, but the additive is usually used in an amount of about 20% by mass or less with respect to the total mass of the oil.

The oil may be prepared as a black color ink or the like using a single dye, or may be prepared as a black color ink using a mixture of plural dyes.

When plural dyes are combined, a combination of a yellow dye having an absorption wavelength range from 400 to 500 nm, a magenta dye having absorption wavelength range from 500 to 600 nm, and a cyan dye having an absorption wavelength range from 600 to 700 nm is preferably used.

Herein, the "black color" means a characteristic in that the differences between the maximum transmittances and the minimum transmittances at 450 nm, 500 nm, 550 nm, and 600 nm are 20% or less, respectively, and the differences are preferably 15% or less, and particularly preferably 10% or less.

The hydrophilic liquid 14 is an electroconductive hydrophilic liquid. Herein, the term "electroconductive" means a characteristic in that the specific resistance is $10^5$ $\Omega \cdot$cm or less, and preferably $10^4$ $\Omega \cdot$cm or less.

The hydrophilic liquid is formed by containing, for example, an electrolyte and an aqueous solvent.

Examples of the electrolyte include salts such as sodium chloride, potassium chloride, or tetrabutylammonium chloride. The concentration of electrolyte in the hydrophilic liquid is preferably from 0.1 to 10 mol/L, and more preferably from 0.1 to 5 mol/L.

As the aqueous solvent, water and an alcohol are suitable, and an aqueous solvent other than water may be contained. Examples of alcohol include ethanol, ethylene glycol, and glycerol.

It is preferable that the aqueous solvent contain no surfactant, from the viewpoint of the responsiveness.

In an electrowetting display apparatus 100, a power source 25 (voltage applying means) that applies a voltage between the electroconductive film 11b and the electroconductive film 12b through the hydrophilic liquid 14, and a switch 26 that enables turning on/off of the voltage are electrically connected.

In the present embodiment, a voltage (electric potential) is applied to the hydrophilic liquid 14 by applying the voltage to the electroconductive film 12b provided on the substrate 12. In this manner, the present embodiment has a configuration in which the surface of the substrate 12 that is being brought into contact with the hydrophilic liquid 14 has an electroconductive structure (a configuration in which an ITO film as an electroconductive film is present on the surface of the substrate material 12a which is in contact with the hydrophilic liquid 14), provided that the present invention is not limited to such an embodiment. For example, an electroconductive film 12b may not be provided on the substrate 12, and an electrode may be inserted in the hydrophilic liquid 14 so that it is possible to apply a voltage (electric potential) from the inserted electrode to the hydrophilic liquid 14.

Next, the operation (voltage on state and voltage off state) of the electrowetting display apparatus 100 will be described.

As shown in FIG. 1, in the voltage off state, the affinity of the oil 16 with the hydrophobic insulation film 20 is relatively high, whereby the oil 16 is brought into contact with the entire surface of the hydrophobic insulation film 20. When the switch 26 of the electrowetting display apparatus 100 is turned on and a voltage is applied, the interface between the hydrophilic liquid 14 and the oil 16 changes its form from the interface 17A shown in FIG. 1 to the interface 17B shown in FIG. 2. As a result, the contact area of the hydrophobic insulation film 20 with the oil 16 decreases, and the oil 16 moves to an end of the cell as shown in FIG. 2. This phenomenon occurs because the surface of the hydrophobic insulation film 20 is electrically charged by the voltage application, and, due to the charge, the hydrophilic liquid 14 pushes the oil 16, which has been brought into contact with the hydrophobic insulation film 20, away, and comes to contact the hydrophobic insulation film 20.

When the switch 26 of the electrowetting display apparatus 100 is turned off to the voltage off state, the state in FIG. 1 is recovered.

In the electrowetting display apparatus 100, the operations of changing the states between the states shown in FIG. 1 and FIG. 2 are repeatedly performed.

Although an embodiment of an electrowetting display apparatus is described above by referring to FIG. 1 and FIG. 2, the present invention is not limited to the embodiment.

For example, although the electroconductive film 11b is provided over the entire surface of the substrate material 11a of the substrate 11 in FIG. 1 and FIG. 2, the electroconductive film 11b may be provided only on a part of the surface of the substrate material 11a. Meanwhile, although the electroconductive film 12b is provided over the entire surface of the substrate material 12a of the substrate 12 in FIG. 1 and FIG. 2, the electroconductive film 12b may be provided only on a part of the surface of the substrate material 12a.

In embodiments, a dye may be added to the oil 16 so as to color the oil 16 with a desired color (for example, black, red, green, blue, cyan, magenta, or yellow), whereby it is possible to attain the function as a pixel for an image display of an electrowetting display apparatus. In this case, the oil 16 functions, for example, as an optical shutter that is capable of switching the on-state and the off-state of the pixel. In this case, the electrowetting display apparatus may be constituted as any of a transmissive system, a reflective system, or a semi-transmissive system.

Further, in the electrowetting display apparatus of the present embodiment, at least one outer surface (opposite to the surface facing the oil) of the first substrate or the second substrate may be provided with a UV shielding layer. As a result, the light resistance of the display apparatus is improved.

As the UV shielding layer, a known UV shielding layer may be used, and, for example, a UV shielding layer (for example, UV shielding film) containing an ultraviolet absorber may be used. It is preferable that the UV shielding layer absorbs 90% or more of light at a wavelength of 380 nm.

The UV shielding layer may be attached to at least one outer surface of the first substrate or the second substrate by a known method such as adhesion using an adhesive.

In an electrowetting display apparatus, the structure shown in FIG. 1 (a region (display cell) which is formed by partitioning the space between the hydrophobic insulation film 20 and the substrate 12 with the silicone rubber wall 22a and the silicone rubber wall 22b, in a lattice form or the like; for example, in a grid pattern) is used as a pixel that is a component of a display unit. By arranging plural of the display cells in two dimensions, it is possible to obtain an image display. In this case, the electroconductive film 11b may be a film which has been patterned independently for each pixel (display cell) (for example, in the case of an active matrix type image display apparatus), or a film which has been patterned in a stripe form spanning over plural pixels (display cells) (for example, in the case of a passive matrix type image display apparatus).

In the electrowetting display apparatus 100, a substrate having optical transparency, such as glass or plastic (polyethylene terephthalate, polyethylene naphthalate, etc.) is used for the substrate material 11a and the substrate material 12a, a film having optical transparency is used for the electroconductive films 11b, 12b and the hydrophobic insulation film 20, whereby the electrowetting display apparatus 100 is used as a transmissive display apparatus. In the pixels of the transmissive display apparatus, by placing a reflective plate outside the display cell, a reflective display apparatus may be constituted.

Meanwhile, pixels of a reflective image display apparatus may be formed by, for example, using a film having a function of a reflective plate (for example, a metal film such as an Al film or an Al-alloy film) for the electroconductive film 11b, or using a substrate having a function of a reflective plate (for example, a metal substrate such as an Al substrate or an Al-alloy substrate) for the substrate material 11a.

A display cell that is a constituent component of the electrowetting display apparatus 100 of the present embodiment, or other configuration of the image display apparatus may follow known configurations as described, for example, in JP-A No. 2009-86668, JP-A No. 10-39800, Japanese National Publication of International Patent Application No. 2005-517993, JP-A No. 2004-252444, JP-A No. 2004-287008, Japanese National Publication of International Patent Application No. 2005-506778, Japanese National Publication of International Patent Application No. 2007-531917, and JP-A No. 2009-86668. Furthermore, a reference may be made to a known configuration of an active matrix type or passive matrix type liquid crystal display apparatus.

An electrowetting display apparatus may be formed using, according to need, in addition to the display cells (display pixels), other constituent components similar as those used in known liquid crystal display apparatuses, such as a backlight, a cell gap adjusting spacer, or a sealing material for sealing. In this case, the oil and hydrophilic liquid may be placed, for example, by an ink-jet process in a region partitioned by silicone rubber walls on the substrate 11.

The electrowetting display apparatus 100 of the present embodiment may be produced, for example, by a method including: preparing a substrate 11 (substrate preparation step); forming a hydrophobic insulation film 20 on an electroconductive surface of the substrate 11; forming partition walls that partition the surface of the formed hydrophobic insulation film 20 on the substrate 11 (partition wall forming step); applying an oil 16 and a hydrophilic liquid 14 (for example, by an ink jet process) to the region partitioned by the partition walls (application step); forming a cell (display unit) by superimposing the substrate 12 onto the surface of the substrate 11 on which the oil 16 and hydrophilic liquid 14 have been applied (cell forming step); and, if necessary, sealing the cell by bonding the substrate 11 and the substrate 12 around the cells (sealing step). The bonding of the substrate 11 and the substrate 12 may be performed using a sealing material commonly used for manufacturing a liquid crystal display apparatus.

Further, after the partition wall forming step and before the cell forming step, a spacer forming step for forming a cell gap adjusting spacer may be provided.

EXAMPLES

Hereinbelow, the present invention will be described in more detail with reference to Examples, but the present invention is not limited to Examples below, unless not departing from the subject.

Example 1

1. Preparation of Colored Solution

Azamethine colorants (the above-mentioned Exemplary Compounds 16, 17, 1, and 3 shown in Table 1 below) and n-decane that was an organic solvent were mixed, respectively, thereby preparing 4 kinds of 0.001%-by-mass n-decane solutions (colored compositions) colored with the azamethine colorants, respectively.

Separately, azo colorants (Comparative Compounds 1 to 3 mentioned below) and n-decane that was an organic solvent were mixed, respectively, thereby preparing 3 kinds of 0.001%-by-mass n-decane solutions (comparative colored compositions) colored with the azo colorants, respectively, as comparative colored compositions.

Comparative Compounds 1 to 3 are the following compounds.

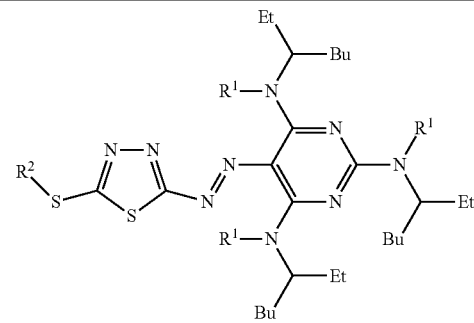

| Comparative Compound | $R^1$ | $R^2$ |
|---|---|---|
| 1 | —H | n-Bu<br>⎯⎯⎯<br>Et |
| 2 | —H | Bu |
| 3 | n-Bu<br>⎯⎯⎯<br>Et | Bu |

Each of the colored solutions was subjected to the following measurement and evaluation. The results of the measurement and evaluation are shown in Table 1.

2. Measurement and Evaluation (1) Color Tone

Each of the colored solutions (colored compositions) was visually observed and evaluated regarding the color tone thereof.

(2) Maximum Absorption Wavelength, Absorbance, and Absorption Coefficient

The maximum absorption wavelength ($\lambda_{max}$) and the absorbance of the colored solutions (colored compositions)

were measured using a visible light spectrophotometer (UV-1800 PC, trade name, manufactured by Shimadzu Corporation). Further, the molar extinction coefficient (∈) at a maximum absorption wavelength ($\lambda_{max}$) of the colorants included in the colored solutions (the colored compositions) was calculated, based on a Lambert-Beer law.

(3) Solubility in Hexane

The solubility of each of the colorants in n-hexane as a non-polar solvent was measured as described below.

the time of voltage application for measurement of 1.0 V at a frequency for measurement of 1 kHz under the conditions of 20° C. and 40% RH using a Model 2353LCR meter (trade name, manufactured by NF Corporation). Based on the equivalent parallel capacitance, the relative dielectric constant of the diluted colorant solution was determined in accordance with the following equation.

Relative dielectric constant of diluted colorant solution=Equivalent parallel capacitance×Interval of electrodes/Area of electrode/Dielectric constant of vacuum (∈0)

TABLE 1

| Colorant | Color of solution | Absorbance (abs) | Molar absorption coefficient (ε) | Maximum absorption wavelength ($\lambda_{max}$) | Relative dielectric constant (1 kHz) | Solubility in hexane [%] | Remarks |
|---|---|---|---|---|---|---|---|
| Exemplary Compound 16 | Red | 0.537 | 47800 | 543 nm | 2.8 | 10 | Present invention |
| Exemplary Compound 17 | Red | 0.710 | 66200 | 545 nm | 4.6 | 5 | Present invention |
| Exemplary Compound 1 | Orange | 0.533 | 28600 | 492 nm | 3.3 | 10 | Present invention |
| Exemplary Compound 3 | Red | 0.797 | 56900 | 545 nm | 5.1 | 40 or more | Present invention |
| Comparative Compound 1 | Orange | 0.439 | 31500 | 464 nm | 6.5 | 40 or more | Comparative |
| Comparative Compound 2 | Orange | 0.492 | 32600 | 464 nm | 6.9 | 40 or more | Comparative |
| Comparative Compound 3 | Orange | 0.340 | 34000 | 430 nm | 5.2 | 40 or more | Comparative |

The respective colorants were each dissolved in n-hexane that had been heated to 50° C. to prepare a saturated solution, and then, the obtained saturated solution was left to stand for 1 hour under an environment of 25° C. and 0.1 MPa. The precipitated colorant was filtered, and the precipitation amount was measured to calculate the solubility (% by mass) of each of the colorants in n-hexane at 25° C. and 0.1 MPa.

(4) Relative Dielectric Constant

The relative dielectric constant of each of the colorants is determined by the following method.

That is, the relative dielectric constants of plural diluted colorant solutions at various concentrations, which had been prepared as described in (4-1) below, were measured, respectively, in the manner as described in (4-2) below. From the results obtained, a straight line (calibration curve) showing the relationship between the colorant concentrations and the relative dielectric constants were created. The relative dielectric constant (calculated value) at a colorant concentration of 100% was determined by extrapolating the straight line (calibration curve), and the obtained value was taken as the relative dielectric constant of the colorant.

(4-1) Method of Preparing Diluted Colorant Solution

The respective colorants and n-decane as an organic solvent are mixed, to thereby prepare n-decane solutions (diluted colorant solutions) at various concentrations, respectively.

(4-2) Method of Measuring Relative Dielectric Constant of Diluted Colorant Solution A diluted colorant solution was sandwiched between ITO electrode-containing glass substrates that are flat plates in parallel facing each other at an electrode interval of 10 μm, and then an equivalent parallel capacitance was measured at As shown in Table 1, Exemplary Compounds 16, 17, 1, and 3 (azamethine-based colorants) each exhibited a high solubility in hexane as a hydrocarbon-based solvent, and dye inks in which the colorants were dissolved well in decane were obtained. Further, Exemplary Compounds 16, 17, 1, and 3 had high molar extinction coefficients (∈) and low relative dielectric constants. Accordingly, Exemplary Compounds 16, 17, 1, and 3 are suitable for preparation of a display unit operating in a principle of an electrowetting method.

Example 2

Preparation of Dye Ink

An argon gas was bubbled in n-decane to obtain a n-decane solution in which the dissolved oxygen concentration of 10 ppm or less, and the colorants were added to the n-decane solution to give dye concentrations of 40% by mass and 10% by mass, respectively, as shown in Tables 2 and 3 below. In this way, dye inks used as oils were prepared.

Preparation of Test Cells

A glass substrate (10 mm×10 mm) having a 100-nm indium tin oxide (ITO) film as a transparent electrode was prepared, and a hydrophobic insulation film was then produced by forming a fluorocarbon polymer layer by coating a fluorocarbon polymer (trade name: CYTOP, Grade number: CTL-809M, manufactured by Asahi Glass Co., Ltd.) to a thickness of 600 nm on the surface of the ITO film. Then, a silicone rubber wall in a picture frame shape was prepared by cutting out a square plate in a size of 8 mm×8 mm×50 μm from the center of a silicone rubber having a size of 1 cm×1 cm (a 50 µm-thick sealing material; trade name: SILIUS, manufactured by Fuso Rubber Go., Ltd.) and was disposed on the fluorocarbon polymer layer, to thereby form a display unit. In a region surrounded by the silicone rubber wall, the dye ink prepared as described above was injected to a thickness of 4 µm. Subsequently, on the injected dye ink, ethylene glycol was injected to a thickness of 46 µm. Then, on the top of the resultant product, a glass substrate having an ITO film was placed and fixed in such a manner that the ITO film faced the dye ink and ethylene glycol. In this way, an electrowetting test cell having the structure shown in FIG. 1 was produced.

Evaluation

A 100 V direct voltage was applied using a signal generator to the ITO films (transparent electrodes) of the two glass substrates having an ITO film, respectively, (specifically, a negative voltage was applied to the ITO electrode on which the fluorocarbon polymer layer (hydrophobic insulation film) had been formed), and the display cell (display cell 30 in FIG. 2) was observed. It was confirmed that the dye ink moved in one direction on the surface of the fluorocarbon polymer layer, and the area on the fluorocarbon polymer layer that is covered by the dye ink reduced. Under the above conditions, the responsiveness of a dye ink and the degree of the backflow phenomenon when kept under application of a voltage were evaluated.

The reduction of the area by application of a voltage was evaluated by the area reduction rate (%) calculated by the following expression (1) and the backflow phenomenon was evaluated by the backflow rate (%) calculated by the following expression (2), respectively.

a) Response time [msec]=Time required to achieve the most reduced area from the initiation of voltage application, starting from the state without voltage application to the state in which the most reduced area was achieved.

b) Area reduction rate [%]=(Most reduced dye ink area)/(Dye ink area before voltage application)×100     Expression (1)

c) Backflow rate [%]=(Dye ink area after 5 sec of voltage application)/(Most reduced dye ink area)×100     Expression (2)

The OD (image density) was evaluated by measuring an OD value at the maximum absorption wavelength of a dye using a spectroradiometer (SR-3 (trade name), manufactured by Topcon Corporation). The OD value was a value per a thickness of 1 µm of the oil layer.

TABLE 2

[Dye Concentration: 40% by mass]

| | | Responsiveness | | | |
|---|---|---|---|---|---|
| Colorant | Area reduction rate [%] | Response time [msec] | Back-flow [%] | OD | Remarks |
| 1 Exemplary Compound 3 (molecular weight: 536) | 20 | <200 | 105 | 2.8 | Present invention |
| 2 Comparative Compound 1 (molecular weight: 718) | >90 | >5000 | Not measurable | 1.8 | Comparative |

TABLE 2-continued

[Dye Concentration: 40% by mass]

| | | Responsiveness | | | |
|---|---|---|---|---|---|
| Colorant | Area reduction rate [%] | Response time [msec] | Back-flow [%] | OD | Remarks |
| 3 Comparative Compound 2 (molecular weight: 662) | >90 | >5000 | Not measurable | 2.0 | Comparative |
| 4 Comparative Compound 3 (molecular weight: 999) | >90 | >5000 | Not measurable | 1.4 | Comparative |

* In Table 2, an area reduction rate of 100% indicates a state without reduction.

TABLE 3

[Dye Concentration: 10% by mass]

| | | Responsiveness | | | |
|---|---|---|---|---|---|
| Colorant | Area reduction rate [%] | Response time [msec] | Back-flow [%] | OD | Remarks |
| 1 Exemplary Compound 16 (molecular weight: 890) | 15 | <200 | <105 | 0.5 | Present invention |
| 2 Exemplary Compound 1 (molecular weight: 536) | 20 | <200 | <105 | 0.7 | Present invention |
| 3 Exemplary Compound 3 (molecular weight: 714) | 15 | <200 | 110 | 0.8 | Present invention |
| 4 Comparative Compound 1 (molecular weight: 718) | 75 | 500 to 1000 | Not measurable | 0.4 | Comparative |
| 5 Comparative Compound 2 (molecular weight: 662) | 75 | 500 to 1000 | Not measurable | 0.5 | Comparative |
| 6 Comparative Compound 3 (molecular weight: 999) | 30 | 400 | Not measurable | 0.3 | Comparative |

* In Table 3, an area reduction rate of 100% indicates a state without reduction.

As shown in Tables 2 and 3, the degrees of the effects exhibited vary depending on the dye concentrations, the display apparatus in which the dyes of the present invention were used exhibited good responsiveness, and the back-flow phenomenon after an image had been displayed (in a voltage application state) was alleviated.

What is claimed is:

1. An electrowetting display apparatus, comprising a display unit, the display unit comprising:
    a first substrate, at least one surface of which is at least partly electroconductive;
    a second substrate disposed so as to face the at least partly electroconductive surface of the first substrate;
    a hydrophobic insulation film disposed on at least a part of the at least partly electroconductive surface of the first substrate;

a non-electroconductive oil that is provided between the hydrophobic insulation film and the second substrate movably on the hydrophobic insulation film and that comprises a non-polar solvent and an azamethine-based colorant comprising two colorant mother nuclei bonded via a linking group represented by =N—, the two colorant mother nuclei being directly bonded to the linking group represented by =N—, the azamethine-based colorant having a solubility in n-hexane at 25° C. and 0.1 MPa of 1% by mass or more; and an electroconductive hydrophilic liquid provided between the hydrophobic insulation film and the second substrate so as to contact the oil;

wherein an image is displayed by applying a voltage between the hydrophilic liquid and the at least partly electroconductive surface of the first substrate and changing the shape of an interface between the oil and the hydrophilic liquid.

2. The electrowetting display apparatus according to claim 1, wherein the azamethine-based colorant comprises neither a metal atom nor a metal compound forming a complex.

3. The electrowetting display apparatus according to claim 1, wherein the azamethine-based colorant comprises a colorant represented by the following Formula (1):

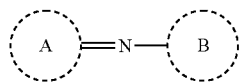

Formula (1)

wherein, in Formula (1), A and B each independently represent a colorant mother nucleus having no dissociable group.

4. The electrowetting display apparatus according to claim 1, wherein the two colorant mother nuclei have the same skeleton.

5. The electrowetting display apparatus according to claim 1, wherein each of the two colorant mother nuclei comprises a pyrrole ring.

6. The electrowetting display apparatus according to claim 1, wherein the azamethine-based colorant comprises a linear or branched alkyl group having 4 to 30 carbon atoms.

7. The electrowetting display apparatus according to claim 1, wherein the azamethine-based colorant has a molecular weight of from 200 to less than 3,000.

8. The electrowetting display apparatus according to claim 1, wherein a total amount of coloring material contained in the oil is 20% by mass or more with respect to a total amount of the oil, and a content of the azamethine-based colorant in the oil is 5% by mass or more with respect to the total amount of the oil.

9. An electrowetting display apparatus, comprising a display unit, the display unit comprising:

a first substrate, at least one surface of which is at least partly electroconductive;

a second substrate disposed so as to face the at least partly electroconductive surface of the first substrate;

a hydrophobic insulation film disposed on at least a part of the at least partly electroconductive surface of the first substrate;

a non-electroconductive oil that is provided between the hydrophobic insulation film and the second substrate movably on the hydrophobic insulation film and that comprises a non-polar solvent and an azamethine-based colorant comprising two colorant mother nuclei bonded via a linking group represented by =N—, the two colorant mother nuclei being directly bonded to the linking group represented by =N—, the azamethine-based colorant comprising a colorant represented by the following Formula (2):

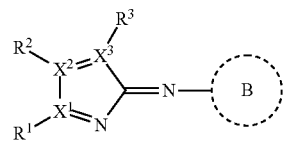

Formula (2)

wherein, in Formula (2), $R^1$, $R^2$, and $R^3$ each independently represent a hydrogen atom or a monovalent substituent; $X^1$, $X^2$, and $X^3$ each independently represent a carbon atom or a nitrogen atom, provided that when $X^1$, $X^2$, or $X^3$ represents a nitrogen atom, none of $R^1$, $R^2$, or $R^3$ is linked to $X^1$, $X^2$, or $X^3$ representing a nitrogen atom; and B represents a colorant mother nucleus having no dissociable group; and an electroconductive hydrophilic liquid provided between the hydrophobic insulation film and the second substrate so as to contact the oil;

wherein an image is displayed by applying a voltage between the hydrophilic liquid and the at least partly electroconductive surface of the first substrate and changing the shape of an interface between the oil and the hydrophilic liquid.

* * * * *